US012600385B1

(12) United States Patent
Papi et al.

(10) Patent No.: US 12,600,385 B1
(45) Date of Patent: Apr. 14, 2026

(54) MACHINE-LEARNED MODEL ARCHITECTURE FOR OCCLUDED OBJECT SPAWNING, TRACK GENERATION, AND/OR TRAJECTORY PREDICTION

(71) Applicant: Zoox, Inc., Foster City, CA (US)

(72) Inventors: Francesco Papi, Oakland, CA (US); Cong Ding, San Jose, CA (US); Mahsa Ghafarianzadeh, San Francisco, CA (US); Willem Prins, San Francisco, CA (US); Nicholas George Dilip Roy, Needham, MA (US); Soham Bhave, Pittsburgh, PA (US); John Welling Ware, Cambridge, MA (US)

(73) Assignee: Zoox, Inc., Foster City, CA (US)

( * ) Notice: Subject to any disclaimer, the term of this patent is extended or adjusted under 35 U.S.C. 154(b) by 177 days.

(21) Appl. No.: 18/385,841

(22) Filed: Oct. 31, 2023

(51) Int. Cl.
    *B60W 60/00* (2020.01)

(52) U.S. Cl.
    CPC . *B60W 60/0027* (2020.02); *B60W 2554/4041* (2020.02); *B60W 2554/4042* (2020.02); *B60W 2554/4044* (2020.02); *B60W 2556/10* (2020.02); *B60W 2556/40* (2020.02)

(58) Field of Classification Search
    CPC ........... B60W 30/095; B60W 50/0097; B60W 60/001; B60W 60/0027; B60W 60/00272; B60W 60/00274; B60W 2420/403; B60W 2420/408; B60W 2554/4041; B60W 2554/4042; B60W 2554/4044; B60W 2554/4045; B60W 2554/40; B60W 2554/4029; B60W 2556/10; B60W 2556/40; G06V 20/56; G06V 20/58; G05D 1/0212; G05D 1/0221; G05D 2107/13; G01C 21/34; G01C 21/3804; G01C 21/3815; G01C 21/3852
See application file for complete search history.

(56) References Cited

U.S. PATENT DOCUMENTS

| 10,649,459 | B2 | 5/2020 | Wang | |
| 11,126,180 | B1 * | 9/2021 | Kobilarov | B60W 30/18163 |
| 11,513,519 | B1 * | 11/2022 | Akella | G05D 1/0276 |
| 11,787,419 | B1 | 10/2023 | Bosse | |
| 2019/0086549 | A1 * | 3/2019 | Ushani | G05D 1/0088 |

(Continued)

OTHER PUBLICATIONS

Mahjourian et al., "Occupancy Flow Fields for Motion Forecasting in Autonomous Driving," Apr. 2022, IEEE Robotics and Automation Letters 7(2):1-1; DOI: 10.1109/LRA.2022.3151613.

(Continued)

*Primary Examiner* — Brandon Z Willis
(74) *Attorney, Agent, or Firm* — Lee & Hayes, P.C.

(57) ABSTRACT

A machine-learned architecture may use sensor data, data derived from the sensor data, and/or to determine a grid indicating objects that are occluded to one or more sensors of a vehicle and velocities associated therewith. This grid may be used to generate a candidate object detection associated with an occluded object and/or an object track associated with the occluded object. The candidate object detection and/or object track may be used to determine a predicted trajectory of the occluded object and, in cases where the occluded object is affirmed by a perception component of the vehicle to be a true positive, may be used to initialize a track associated with the newly disoccluded object.

20 Claims, 7 Drawing Sheets

(56)　　　　　References Cited

U.S. PATENT DOCUMENTS

| | | | |
|---|---|---|---|
| 2020/0278681 A1* | 9/2020 | Gier | G05D 1/0246 |
| 2021/0181758 A1* | 6/2021 | Das | G06F 18/25 |
| 2021/0261123 A1* | 8/2021 | Wray | B60W 60/001 |
| 2021/0271249 A1* | 9/2021 | Kobashi | G06V 20/58 |
| 2022/0185267 A1* | 6/2022 | Beller | B60W 30/0956 |
| 2023/0041975 A1 | 2/2023 | Caldwell | |
| 2023/0056589 A1* | 2/2023 | Trojahner | B60W 60/0016 |

OTHER PUBLICATIONS

U.S. Appl. No. 18/084,419, filed Dec. 19, 2022.

\* cited by examiner

TOP-DOWN REPRESENTATION 500

VIRTUAL OBJECT GRID 600

MACHINE-LEARNED MODEL ARCHITECTURE FOR OCCLUDED OBJECT SPAWNING, TRACK GENERATION, AND/OR TRAJECTORY PREDICTION

BACKGROUND

Autonomous or semi-autonomous vehicles may be equipped with one or more types of sensors to enable autonomous or semi-autonomous navigation. However, depending on the type of sensor, objects may be occluded from a sensor's view. For example, similar to humans, objects may be occluded from view by other objects-a vehicle or pedestrian on the other side of a semi-truck from a visible light camera may be occluded. Objects that were occluded and then come into view of one or more sensors of the vehicle may be termed "disoccluded." These objects may be particularly troublesome for vehicles and humans alike, since they may become disoccluded directly in the vehicle's path, such as when the object was hidden behind a blind corner, in an obscured driveway, hidden behind another object, or the like. Accordingly, occluded objects may threaten the safety of the vehicle or their safety may be threatened themselves if the occluded object doesn't check first for passing vehicles before passing into a roadway from a blind corner or the like.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
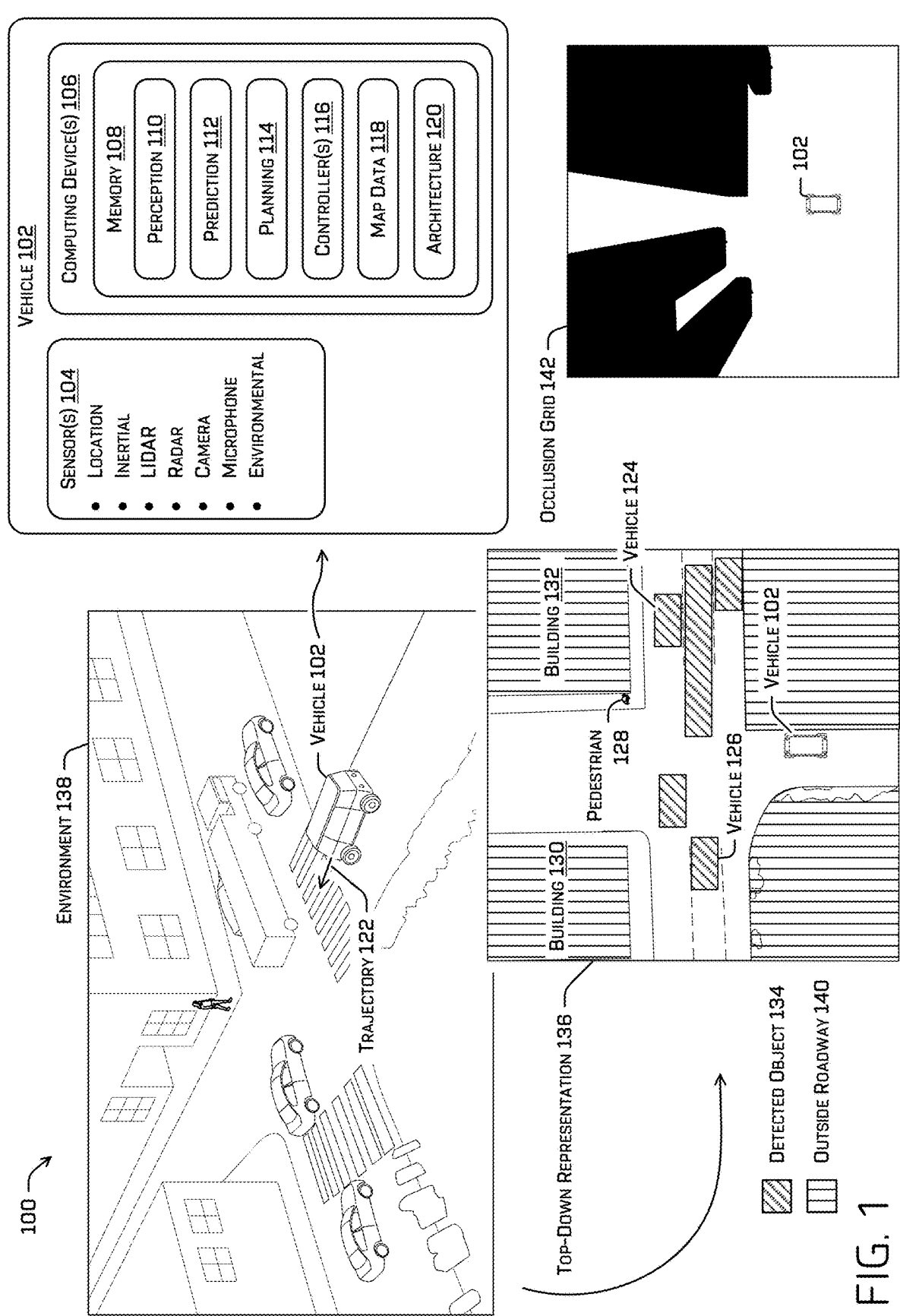
FIG. 1 illustrates an autonomous vehicle and an example scenario that includes multiple occluded objects and includes a determination of an occlusion grid.

The techniques (e.g., hardware, software, machines, and/or processes) discussed herein may include a machine-learned model architecture that generates candidate object detections for occluded objects. Such an object detection may be a candidate in that it may be determined by the machine-learned model to be the likely location of an object that is hidden from view of one or more sensors of the vehicle. This object could be an object that the vehicle had previously detected and has been occluded by another object or an object that the vehicle hasn't detected using sensor data. For either example, the object may treat the candidate object detection like an object detection that is based on sensor data—in essence, treating the candidate object detection as a true positive object detection until sensor data or further iterations of the machine-learned model architecture indicate that the candidate object detection is a false positive (as determined using sensor data) or is likely a false positive (e.g., by the machine-learned model outputting lower confidence score(s) associated with the candidate object detection over time or at a subsequent time).

To contrast a candidate object detection generated by the machine-learned model discussed herein from an object detection that is generated directly from sensor data, the candidate object detection is referred to herein as a virtual object. A nominal object detection may be determined by a perception component of the vehicle based on sensor data that includes a depiction of the detected object. For example, a visible light image may comprise a portion of the image that depicts the object, a lidar point cloud may have voxels or three-dimensional points attributable to a surface of the object, radar returns may comprise radar returns that are attributable to the object, etc.

Whereas, the candidate object detection generated by the machine-learned model discussed herein may be comprise an estimate that an object may exist in a region of the environment occluded to one or more sensors of the vehicle (i.e., an occluded region) or that an object will be newly disoccluded within view of one or more sensors of the vehicle. Instead of using a direct observation of the object within the sensor data like a nominal object detection generated by the perception component, the machine-learned model discussed herein may be trained to use a variety of data to infer or estimate that an object likely exists in an occluded region or that such an object is likely to spawn or pop into view of a sensor of the autonomous vehicle. As used herein "disoccluded" means that an object that was occluded has come into view of a sensor of the autonomous vehicle. The machine-learned model may be used to determine a candidate object detection for objects that were in view of a sensor and disappeared from view and/or when a disappeared object may reappear/disocclude.

The machine-learned model may additionally or alternatively determine a candidate object detection for an object that the vehicle has not previously detected. Such a candidate object detection may be an estimate that an object has newly spawned, i.e., the object has recently entered the environment around the vehicle or will enter the environment soon, or that the object exists but has not been indicated in any sensor data received by the vehicle (yet, potentially). In such as case, the vehicle may not have previously detected this object within a time period. For example, if the vehicle is located in a long queue of cars, some cars ahead of the vehicle may not have been detected by the vehicle yet but the machine-learned model may generate a candidate object detection for estimated cars and their positions ahead or behind the vehicle in the queue or in queues near the vehicle. In an example of a virtual object generated by the machine-learned model for an object that has spawn or will spawn soon, the machine-learned model may generate a candidate object detection in a driveway that is obscured from view of one or more sensors of the vehicle. If an object exists in such a driveway and the vehicle is approaching the driveway, the vehicle may not have previously detected the object, yet the machine-learned model discussed herein may generate a candidate object detection in a portion of the top-down representation associated with the driveway. Additionally or alternatively, the machine-learned model may determine a candidate object detection for an object that should have just come into view of a sensor of the vehicle. Such a candidate object detection may be based at least in part on one or more previously generated object detections for an occluded object that should have recently come into view, or this candidate object detection may estimate that an object has come into view. Sensor data received by the vehicle may be used to affirm this object detection as a true positive or to indicate that this candidate object detection is a false positive. In some examples, the determination that a virtual object was a true positive or a false positive may be used as part of refining the machine-learned model.

The machine-learned model discussed herein may be trained to use a top-down representation of an environment, a vehicle state, and an occlusion grid to generate a virtual object grid. The input data (e.g., the top-down representation of an environment, the vehicle state, and the occlusion grid) may be encoded as a multi-channel image and the virtual object grid may comprise an image that encodes the output data discussed herein. The virtual object grid may comprise pixels or other portions associated with discrete portions or regions of the environment. A portion of the virtual object grid may indicate a likelihood that a portion of the environment is occupied by a virtual object (i.e., an occluded object or an object that will newly come into view) and/or a velocity associated with the virtual object. In some examples, the likelihood may be indicated as a logit and the velocity may be indicated as a logit or the velocity may be determined based at least in part on a difference in position of a virtual object in the virtual object grid over time steps associated with the virtual object grid. In the latter example, the virtual object grid may comprise multiple virtual object grids, each virtual object grid associated with a different time step from a current time, t, to a time in the past, t-n, where n is a positive integer. In such an example, the known difference in time between two virtual object grids output by the machine-learned model and a difference in the location of a centroid of a virtual object or a difference in a location of some other portion of the virtual object (e.g., a respective pixel, a front left corner, or the like). In some examples, multiple top-down representations, vehicle states, and occlusion grids may be provided as input to the machine-learned model, each set of the respective data associated with a different time step from a current time, t, to a time in the past, t-n. The virtual object grid may comprise grids associated with time steps that match the time steps of the input data in some examples, although in additional or alternate examples, the input data may be associated with a different time range or time steps as time range or time steps of the virtual object grids.

The top-down representation used by the machine-learned model may be determined by receiving sensor data from one or more sensors and may determine a top-down representation of the environment, which may be a birds eye view image that encodes information associated with the environment. For example, the top-down representation may encode map data (e.g., which may indicate a roadway shape and extents, signage, static object(s), and/or the like), object detection data determined by a perception component of the vehicle for a detected object in the environment (e.g., object position, orientation, velocity, classification, and/or the like), environment state data (e.g., a traffic light state, a weather condition), and/or vehicle state data, as discussed in U.S. Patent Application Pub. No. 2021/0181758, filed Jan. 30, 2020, the entirety of which is incorporated by reference herein for all purposes. In some examples, the top-down representation may comprise vehicle state data indicating a position, orientation, velocity, and/or the like associated with the vehicle itself, or the vehicle state data may be provided to the machine-learned model separately from the top-down representation.

In some examples, the top-down representation may comprise an occlusion grid or the occlusion grid may be provided to the machine-learned model separately from the top-down representation or as a mask associated with the top-down representation. The occlusion grid may comprise an occluded region that may be determined based at least in part on a vehicle pose (i.e., position and/or orientation of the vehicle) and a relative sensor pose (i.e., a position and/or orientation of a sensor relative to the vehicle pose), characteristics associated with the type of sensor (e.g., attenuation constant(s), transmission wavelength, receiver wavelength, object or map classification that obscures a particular sensor modality, a field of view of the sensor, a frustum of the sensor), one or more object detections, and/or map data. For example, the map data may be used to indicate the location of static object(s) (which may be additionally or alternatively be indicated by object detection(s)) and/or a topography of the environment. The map data and/or the object detection(s) may be used to determine a portion of the environment that is occluded to sensor(s) of a particular type of sensor or to sensor(s) of one or more types of sensors.

The techniques discussed herein may additionally or alternatively be used to determine a likelihood that an occluded region identified by an occlusion grid contains one or more objects. In other words, the machine-learned model may output, in addition to or instead of the occupancy likelihood and/or velocity of the virtual object grid, a likelihood that an occluded region contains one or more objects and/or a number of objects predicted to be contained within the occluded region. In such an example, the machine-learned model may segment the occupancy grid into discrete occluded regions and may predict a likelihood and/or number of objects in each occluded region. This output may be used as intermediate data that is provided to a final portion (e.g., one or more layers, an output head) of the machine-learned model as input and/or may be exposed as an output from the machine-learned model, e.g., to a perception component and/or planning component of the vehicle. In some examples, this more coarse prediction may be used by the planning component to determine a cost associated with a candidate action. In an additional or alternate example, a sum of the occupancy likelihoods contained within an occluded region may be used as a representation of the importance or potential safety hazard of that occluded region. Such a sum may be provided as input to the planning component, which may use such a sum and the occluded region as part of determining a cost associated with a candidate trajectory for controlling the vehicle.

In some examples, an occupancy likelihood may be associated with a portion of the environment that is on the border of an occluded region. An object associated with such a likelihood may be considered a newly disoccluded object since part of the object may be newly disoccluded or the object may be one time step from coming into view of one or more sensors of the object. However, the machine-learned model 402 may additionally or alternatively determine an occupancy likelihood in a non-occluded portion of the environment that is on the boundary of an occluded region to capture the possibility of small object such as a pedestrian disoccluding from a small occluded region.

In some examples, the machine-learned model may comprise an additional output head (e.g., one or more learned layers) to determine a candidate object detection and/or virtual object track using the virtual object grid. Additionally or alternatively, an additional post-processing component may determine the candidate object detection and/or virtual object track. In some examples, the post-processing component may comprise a machine-learned model, such as a computer vision model, that determines a region of interest, (e.g., a bounding box, a bounding shape) predicted to contain a region occupied by the virtual object, a position, orientation, and/or velocity of the virtual object. In some examples, the post-processing component may suppress any occupancy likelihoods (e.g., logits) that are less than a threshold likelihood (e.g., 0.5, 0.7, any other suitable number), blur the remaining likelihoods (e.g., Gaussian blur) as a blurred representation, then using a set of learned layers (e.g., one or more connected layers, a multi-layer perceptron, a perceptron pyramid, or the like) to determine the candidate object detection (e.g., the ROI, position, orientation, and/or velocity). In some examples, the post-processing component may determine the virtual object track by applying the process above to multiple virtual object grids that were generated by the machine-learned model for different time steps into the past to determine a current and historical set of ROIs, positions, orientations, and/or velocities of the virtual object over time from t-n to the current time, t.

In some examples, the velocity component of the candidate object detection and/or virtual object track may be determined based at least in part on the velocities indicated by the virtual object grid within the ROI of the candidate object detection. For example, the post-processing component may determine an average or median of the velocities within the ROI, a velocity of a center of the object based at least in part on rigid body kinematics, or a machine-learned component may determine the velocity to associate with the object detection and/or virtual object track based at least in part on aggregating the velocities within the ROI using learned layers of the machine-learned component. In some examples, the velocity of the object or velocities of the object may be used to update an object track determined for the object if the virtual object is indicated as being a true positive based at least in part on an output of the perception component.

The virtual object grid, candidate object detection, virtual object track, and/or predicted trajectory for the virtual object may be provided to any of a number of components of the vehicle for a variety of purposes. For example, the candidate object detection and/or virtual object track may be provided as input to a prediction component of the vehicle. The prediction component may use the candidate object detection and/or virtual object track to determine a predicted trajectory for the virtual object. For example, a kinematics model or machine-learned model of the predicted component may use the candidate object detection and/or virtual object track to determine a predicted position, orientation, and/or velocity of the virtual object at a future time.

In some examples, the candidate object detection, virtual object track, and/or predicted trajectory may be provided as input to a perception component of the vehicle. The perception component may use sensor data received at the vehicle to detect and/or track objects in the environment. Upon detecting an object, the perception component may determine whether the newly detected object is associated with a candidate object detection and/or virtual object track by comparing the candidate object detection, virtual object track, and/or predicted trajectory to object detection data for the newly detected object. For example, the perception component may determine a difference between the detected position, orientation, and/or velocity of the newly detected object to a position, orientation, and/or velocity indicated by the candidate object detection, virtual object track, and/or predicted trajectory.

If the difference(s) are less than respective threshold difference(s) or if more than a threshold number of the differences are less than their respective threshold differences, the perception component may indicate that the newly detected object was a virtual object predicted by the machine-learned model discussed herein. In that case, the perception component may use the virtual object track to initialize an object track associated with the newly detected object. This is highly useful because without the virtual object data determined by the machine-learned model discussed herein, a newly detected object would not have an object track since there are no historical object detection(s) associated with the newly detected objects. Accordingly, other techniques might rely on a heuristic object track that retroactively estimates an object track for the newly detected object based on its current movement or the other techniques may merely allow subsequent detections of that same object to build an object track for the object. The technique described herein where the object track may be initialized with the virtual object track may be advantageous because a more accurate object track may result in more accurately predicting a future trajectory of the object and accordingly may benefit the safety and efficiency of the vehicle's own trajectory planning. In some examples, initializing the object track for the newly detected object may comprise modifying the virtual object track based at least in part on the current object detection data to account for any errors in the virtual object track, such as by modifying previous position(s), orientation(s), and/or velocity(ies) to better align with the object detection data determined for the newly detected object.

In some examples, the virtual object grid, candidate object detection, virtual object track, and/or predicted trajectory for the virtual object may additionally or alternatively be provided to a planning component of the vehicle. For example, the virtual object grid may be used as part of a cost map for determining a cost associated with the vehicle reaching a position in the environment and/or a speed at which the vehicle reaches that position in the environment. In some examples, that cost may increase as the safety risk, passenger discomfort, or the like increases as a function of proximity to detected objects, virtual objects, and/or the like. Additionally or alternatively, the candidate object detection, virtual object track, and/or predicted trajectory may be used as part of determining a cost associated with a candidate trajectory for controlling the vehicle. For example, the planning component of the autonomous vehicle may comprise a tree search algorithm that iteratively determines different candidate trajectories that the vehicle could implement for a series of time periods up to a time horizon. For each time period, the tree search may generate a set of candidate trajectories for controlling the vehicle over that time period and may determine a cost associated with a candidate trajectory. In some examples, a cost may be determined by a cost function for each candidate action based at least in part on the candidate object detection, virtual object track, and/or predicted trajectory. The tree search may then select one candidate trajectory for further exploration based at least in part on determining that the cost associated with the candidate trajectory is the lowest cost among the costs associated with the set of candidate actions for the first time step or is a cost that is below a threshold. The tree search may then determine, for a subsequent time period, a new set of candidate trajectories that stem from the last selected candidate trajectories and repeat the process until a time horizon, distance, or target location is achieved. The candidate object detection, virtual object track, and/or predicted trajectory may be used as part of determining the cost associated with a candidate trajectory based at least in part on determining how close to the virtual object the candidate trajectory would take the vehicle, and/or other safety factors.

The techniques discussed herein may increase safety and efficacy of a vehicle by enabling the vehicle to detect occluded objects. The techniques may reduce collisions attributable to an object deoccluding in front of the vehicle at a last moment when the vehicle can't brake in time to avoid hitting the object and/or reducing interactions where the vehicle or an object need to employ evasive maneuvers to avoid colliding. Accordingly, the techniques may equip the vehicle with abilities that outstrip human capabilities and increase the vehicle's safety beyond what a human may be capable of achieving. The techniques may also improve the accuracy of predicted trajectories for occluded objects and/ or of object tracks for objects that have newly disoccluded. The techniques may also be relatively computationally simple (e.g., light on computational processing, storage, and/or transmission) by determining candidate object detections, virtual object tracks, and/or predicted trajectories that have a same data format and/or data structure as nominally detected objects that aren't occluded. This may further simplify the components that use the candidate object detections, virtual object tracks, and/or predicted trajectories as input since fusion with other nominal object detections, tracks, and/or predicted trajectories is unnecessary.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, aircraft, watercraft, and/or the like.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry data (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor), an image sensor (e.g., a visual light camera, infrared camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a prediction component 112, a planning component 114, system controller(s) 116, map data 118, and/or architecture 120. For example, the memory 108 may store processor-executable instructions that, when executed by one or more processors, execute various operations discussed herein. In some examples, the perception component 110 may include a simultaneous localization and mapping (SLAM) component.

In general, the perception component 110 may determine what is in the environment surrounding the vehicle 102 and the planning component 114 may determine how to operate the vehicle 102 according to information received from the perception component 110. For example, the planning component 114 may determine trajectory 122 for controlling the vehicle 102 based at least in part on the perception data and/or other information such as, for example, localization information (e.g., where the vehicle 102 is in the environment relative to a map and/or features detected by the perception component 110), an output determined by the architecture 120 such as a set of paths associated with one of the detected objects, a predicted trajectory for an object or virtual object, a virtual object track, and/or the like. In some examples, the perception component 110 may comprise a pipeline of hardware and/or software, which may include one or more graphics processing unit(s) (GPU(s)), tensor processing unit(s) (TPU(s)), central processing unit(s) (CPU(s)), application-specific integrated circuit(s) (ASIC(s)), field-programmable gate array(s) (FPGA(s)), ML model(s), Kalman filter(s), and/or the like.

The trajectory 122 may comprise instructions for controller(s) 116 to actuate drive components of the vehicle 102 to effectuate a steering angle, steering rate, acceleration, and/or the like, which may result in a vehicle position, vehicle velocity, and/or vehicle acceleration. For example, the trajectory 122 may comprise a target heading, target steering angle, target steering rate, target position, target velocity, and/or target acceleration for the controller(s) 116 to track. In some examples, the trajectory 122 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters).

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), a pose of the vehicle (e.g. position and/or orientation in the environment, which may be determined by or in coordination with a localization component), local map data that identifies characteristics detected in proximity to the vehicle (e.g., locations and/or dimensions of buildings, trees, fences, fire hydrants, stop signs, and any other feature detectable in various sensor modalities), etc.

In particular, the perception component 110 may determine, based at least in part on sensor data, an object detection indicating an association of a portion of sensor data with an object in the environment. The object detection may indicate an object classification (e.g., semantic label, object state), sensor data segmentation (e.g., mask, instance segmentation, semantic segmentation), a region of interest (ROI) identifying a portion of sensor data associated with the object, object classification, and/or a confidence score indicating a likelihood (e.g., posterior probability) that the object classification, ROI, and/or sensor data segmentation is correct/accurate (there may be confidence score generated for each in some examples). For example, the ROI may include a portion of an image or radar data identified by an ML model or ML pipeline of the perception component 110 as being associated with the object, such as using a bounding box, mask, an instance segmentation, and/or a semantic segmentation. The object classifications determined by the perception component 110 may distinguish between different object types such as, for example, a passenger vehicle, a pedestrian, a bicyclist, a delivery truck, a semi-truck, traffic signage, and/or the like. In some examples, object detections may be tracked over time. For example, a track may associate two object detections generated at two different times as being associated with a same object and may comprise a historical and/or current object position, orientation, velocity, acceleration, classification, and/or other state of that object (e.g., door/aperture state, turning state, intent state such as activation turn signal).

To give a concrete example, the vehicle 102 may receive sensor data including image data (from one or more image sensors) and/or other sensor data associated with the environment, such as lidar data, radar data, ToF data, and/or the like. The perception component may detect and classify objects in the environment. For example, the perception component may detect dynamic objects, such as a cyclist, vehicle, pedestrian, or the like, and/or static objects, such as poles, traffic signage, general signage, a drivable surface, sidewalk, public furniture, building, etc. Referring to FIG. 1, the perception component 110 may detect vehicle 124, vehicle 126, pedestrian 128, and other objects, such as objects indicated by diagonally-hashed rectangles 134 in the top-down representation 136. In some examples, the perception component 110 may additionally or alternatively detect building 130 and building 132. In some examples, these buildings may additionally or alternatively be indicated in map data 118 stored in the memory 108. The map data 118 may indicate other stationary (static) objects and/or zones, such as crosswalks, sidewalks, signage, construction zones (e.g., which may be temporarily indicated in the map data), rules of the road (e.g., yield priority, right-of-way rules, speed limits, mandated stops) associated with regions of the environment (e.g., junctions, crosswalks, lanes), and/or the like.

The perception component 110 may additionally or alternatively determine a top-down representation 136 of the environment based at least in part on the sensor data, as discussed in U.S. Patent Application Pub. No. 2021/0181758, filed Jan. 30, 2020, and/or U.S. Pat. No. 10,649,459, Apr. 26, 2018, the entirety of which are incorporated by reference herein for all purposes. For example, the top-down representation may be generated based at least in part on an object detection generated by the perception component 110 and/or map data 118. FIG. 1 depicts an example top-down representation 136 that may be generated by the perception component 110 based at least in part on sensor data and/or map data 118 for the environment 138. This top-down representation 136 may include indications of detected objects as diagonally-hashed rectangles 134 and portions of the environment outside the roadway may be indicated by vertical hashes 140. In some examples, the top-down representation may include a data structure, such as an image, where each pixel is associated with one or more channels indicating different characteristics of the environment, including any object detections and/or map data.

For example, instead of indicating color data, a pixel of the top-down representation 136 may indicate object data and/or map data, each of which may include one or more channels of the image. In an RGB image, a first channel indicates an amount of red at a pixel, a second channel indicates an amount of blue at the pixel, and a third channel indicates an amount green at the pixel, which collectively make up a color for that pixel. However, for a top-down representation, a pixel may have channel(s) dedicated to different object data that may include a global location of the pixel (i.e., a location in the environment that the pixel is associated with), whether an object is detected as existing at the pixel location or a likelihood that an object exists at the pixel/environment location, an orientation of an object indicated as existing at the location, a velocity and/or acceleration of the object, a classification associated with an object, whether an object is static or dynamic, a track associated with the object, a signage state (e.g., red light, green light, lane unavailable, directionality of a lane), other object state (e.g., left turn signal on, vehicle left side door open), map data, environment state data (e.g., a state of a traffic light, a weather condition, or the like, although environment state data may incorporate map data and/or object data in some examples), and/or the like. To further illustrate how this may practically be carried out as an example and without limitation, an object instance channel of the pixel may indicate a binary indication, such as 1 or 0, that an object exists at the pixel/location or a likelihood that an object exists at the pixel/location that was output by the perception component 110 as a number between 0 and 1 may be converted to a value that may depend on a number of bits or dynamic range associated with the pixel.

For example, if a channel of a pixel of the top-down representation 136 has 32-bits, the likelihood may be converted to a 32-bit representation of the number between 0 and 1—a likelihood of 0.25 could be represented as the value 8 or a likelihood of 0.3 could be represented as the value 10 in the object instance channel for that pixel. Pixel channels may have more or less bits and may encode object data differently. For example, a semantic object classification may be encoded using a value where 0 represents no object being present, 1 represents a pedestrian, 2 represents a vehicle, 3 represents an oversized vehicle, 4 represents a construction zone, and/or the like. To give another candidate example, object orientation may be quantized such that orientations between 0 and 10° may be quantized as the value 0, orientations between 10° and 20° may be quantized as the value 1, and so on, depending on the number of bits available for an orientation channel associated with the pixel. In an additional or alternate example, one of the object channels may indicate whether other object channels are associated with current, previous, or predicted object data.

In some examples, multiple top-down representations of the environment may be determined in association with different times. For example, a first top-down representation may be associated with a current environment state (e.g., current object detections, map data, and/or general environment state data) and/or one or more second top-down representations may be associated with previous environment state(s).

The top-down representation 136 may additionally or alternatively include channel(s) indicating map data, such as the existence of a roadway, a type of roadway junction (e.g., four-way controlled intersection, T-junction uncontrolled, six-way light-controlled intersection), signage existence and/or type (e.g., yield sign, traffic control light), sidewalk existence, region of interest (e.g., construction zone, crosswalk, parking location, passenger pickup/drop-off location), a direction of travel associated with a roadway, and/or the like. The channel(s) of the top-down representation 136 may additionally or alternatively indicate that a location associated with a pixel is outside a roadway and/or a sidewalk.

In some examples, the perception component 110 may additionally or alternatively determine an occlusion grid 142. In some examples, the occlusion grid may comprise a portion that indicates a likelihood that a portion of the environment is occluded to one or more sensors and/or which particular sensor types of the vehicle. For example, a region may be occluded to a camera but not to radar or, in fog, a region may be occluded to the lidar sensors but not to cameras or radar to the same extent. In the depicted example, the pedestrian 128 and the vehicle 124 may lie in a region indicated by the occlusion grid 142 as being occluded to one or more sensors of the vehicle 102.

The data produced by the perception component 110 may be collectively referred to as perception data, which may include the top-down representation 136, object detection data, and/or a track associated with an object. Once the perception component 110 has generated perception data, the perception component 110 may provide the perception data to prediction component 112, the planning component 114, and/or the architecture 120. The perception data may additionally or alternatively be stored in association with the sensor data as log data. This log data may be transmitted to a remote computing device (unillustrated in FIG. 1 for clarity) for use as at least part of training data for architecture 120.

In some examples, the architecture 120 may use perception data to determine a virtual object grid, candidate object detection, and/or virtual object track discussed herein. The architecture 120 may provide the virtual object grid, candidate object detection, and/or virtual object track to the perception component 110 (e.g., for the perception component 110 to indicate that a current or previous output of the architecture 120 is a false positive or true positive and/or to initialize an object track associated with a true positive output of the architecture 120), prediction component 112 (e.g., for the prediction component 112 to generate a predicted trajectory for a candidate object detection output by the architecture 120), and/or the planning component 114 (e.g., for the planning component 114 to incorporate the output(s) of the architecture 120 as part of determining a trajectory for controlling the vehicle 102).

In some examples, the prediction component 112 may receive sensor data, perception data, a candidate object detection, and/or virtual object track, and may determine a predicted state of dynamic objects in the environment, including a candidate object detection output by the architecture 120. In some examples, dynamic objects may include objects that move or change states in some way, like vehicles, pedestrians, cyclists, traffic lights, moving bridges, train gates, and the like. The prediction component 112 may use such data to a predict a future state, such as a position, orientation, velocity, acceleration, other object state (e.g., turning state, indicator state (e.g., traffic light state, turn indicator state), door/aperture open/closed, vehicle loading/unloading), or the like, which collectively may be described as prediction data.

The planning component 114 may use the perception data received from perception component 110 and/or prediction data received from the prediction component 112 and/or architecture 120, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 114 may determine a route for the vehicle 102 from a first location to a second location; generate, substantially simultaneously and based at least in part on the perception data and/or simulated perception data (which may further include predictions regarding detected objects in such data), a plurality of candidate trajectories for controlling motion of the vehicle 102 in accordance with a receding horizon technique (e.g., 1 micro-second, half a second) to control the vehicle to traverse the route (e.g., in order to avoid any of the detected objects); and select one of the candidate trajectories as a trajectory 122 of the vehicle 102 that may be used to generate a drive control signal that may be transmitted to drive components of the vehicle 102. In some examples, the trajectory 122 may be part of a series of trajectories (i.e., a path) determined by a tree search conducted by the planning component 114 based at least in part on the sensor data, perception data, prediction data, map data 118, top-down representation 136, and/or output of architecture 120, as discussed in more detail in U.S. Patent Application Pub. No. 2023/0041975, filed Aug. 4, 2021, the entirety of which is incorporated by reference herein for all purposes. FIG. 1 depicts an example of such a trajectory 122, represented as an arrow indicating a heading, velocity, and/or acceleration, although the trajectory itself may comprise instructions for controller(s) 116, which may, in turn, actuate a drive system of the vehicle 102. In some examples, the planning component 114 may determine the trajectory 122 based at least in part on determining a predicted trajectory for a virtual object that may be determined based at least in part on output of architecture 120.

In some examples, the controller(s) 116 may comprise software and/or hardware for actuating drive components of the vehicle 102 sufficient to track the trajectory 122. For example, the controller(s) 116 may comprise one or more proportional-integral-derivative (PID) controllers to control vehicle 102 to track trajectory 122.

Example System

Figure 2:
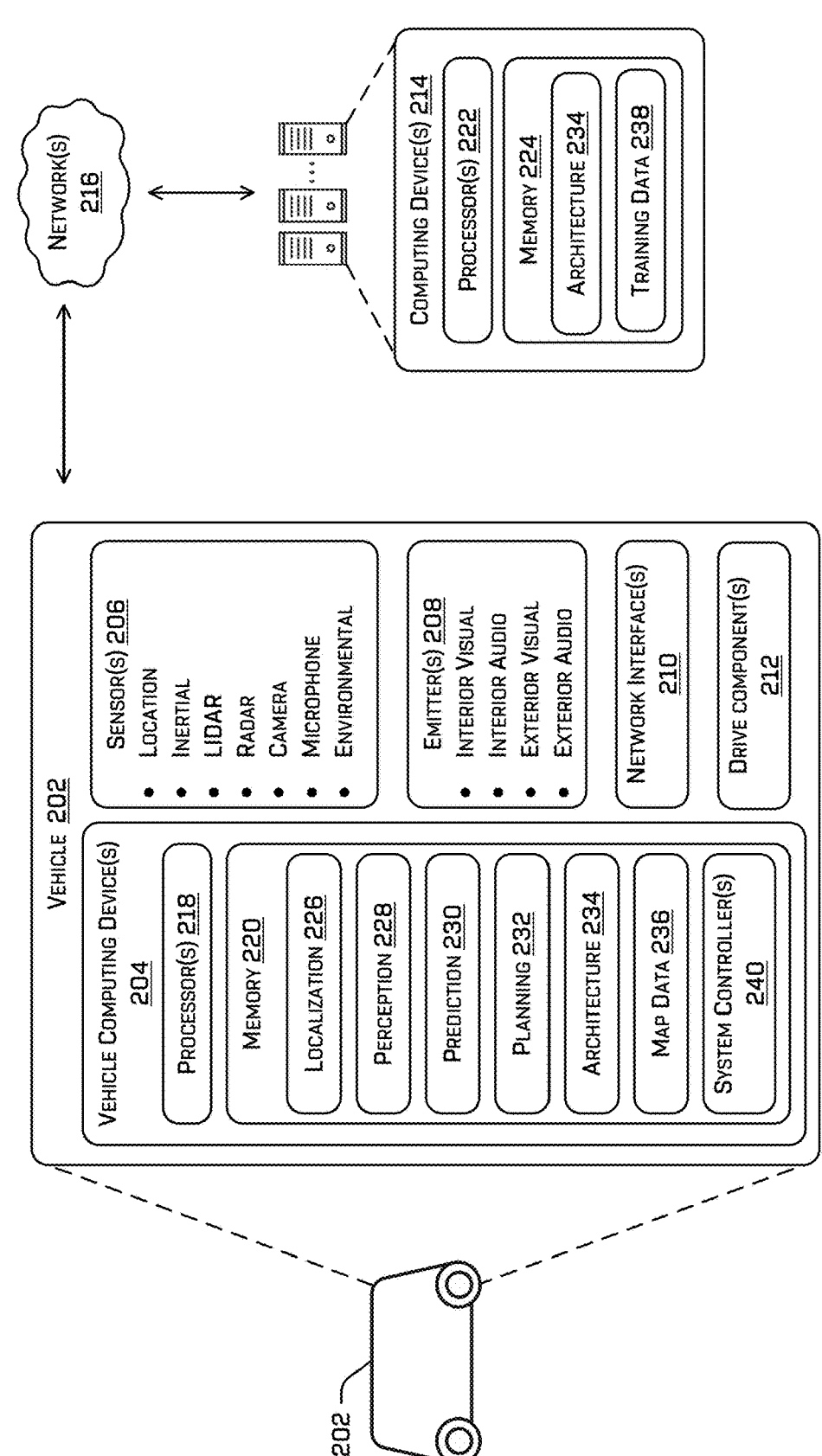
FIG. 2 illustrates a block diagram of an example system integrating and/or training the machine-learned model architecture discussed herein and/or a component(s) of the vehicle that can use a virtual object grid, virtual object track, and/or predicted trajectory generated for a candidate object detection generated for a virtual object to mitigate the risk associated with occluded objects.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as ultra-high frequency (UHF) (e.g., Bluetooth®, satellite), cellular communication (e.g., 3G, 4G, 4G LTE, 5G, etc.), or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, prediction component 230, planning component 232, architecture 234, map data 236, training data 238, and/or system controller(s) 240—zero or more portions of any of which may be hardware, such as GPU(s), CPU(s), and/or other processing units. Perception component 228 may represent perception component 110, prediction component 230 may represent prediction component 112, planning component 232 may represent planning component 114, architecture 234 may represent architecture 120, map data 236 may represent map data 118, and/or system controller(s) 240 may represent controller(s) 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment, such as map data 236, and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some examples, the localization component 226 may determine localization and/or mapping data comprising a pose graph (e.g., a sequence of position(s) and/or orientation(s) (i.e., pose(s)) of the vehicle 202 in space and/or time, factors identifying attributes of the relations therebetween, and/or trajectories of the vehicle for accomplishing those pose(s)), pose data, environment map including a detected static object and/or its distance from a pose of the vehicle 202, and/or the like In some instances, the localization component 226 may provide data to various components of the vehicle 202 to determine an initial position of an autonomous vehicle for generating a trajectory and/or for generating map data. In some examples, localization component 226 may provide, to the perception component 228, prediction component 230, and/or architecture 234 a location and/or orientation of the vehicle 202 relative to the environment and/or sensor data associated therewith. For example, the output of the localization component 226 may be used as part of determining a vehicle state associated with the vehicle 202 that may be used by the architecture 234 as part of the techniques discussed herein.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, acceleration, and/or other state associated with an object), and/or the like. The perception component 228 may include a prediction component that predicts actions/states of dynamic components of the environment, such as moving objects, although the prediction component may be separate, as in the illustration. In some examples, the perception component 228 may determine a top-down representation of the environment that encodes the position(s), orientation(s), velocity(ies), acceleration(s), and/or other states of the objects, map data, and/or general environment state data for the environment. For example, the top-down representation may be an image with additional data embedded therein, such as where various pixel channel values encode the perception data and/or map data discussed herein. Data determined by the perception component 228 is referred to as perception data.

The prediction component 230 may predict a future state of an object in the environment surrounding the vehicle 202. Such an object may be an object that appears in sensor data received by the vehicle or a virtual object generated by the architecture 234. In some examples, the future (predicted) state may indicate a future position, orientation, velocity, acceleration, and or other state (e.g., door state, turning state) of the object. The predicted state may comprise a series of such states or a single such state. In some examples, the prediction component 230 may use an object detection and/or object track (or candidate object detection and/or virtual object track) to determine a predicted trajectory associated with the object or virtual object. Data determined by the prediction component 230 is referred to as prediction data. In some examples, the prediction component 230 may determine a top-down representation of a predicted future state of the environment. For example, the top-down representation may be an image with additional data embedded therein, such as where various channel pixel values encode the prediction data discussed herein.

The planning component 232 may receive a location and/or orientation of the vehicle 202 from the localization component 226, perception data from the perception component 228, prediction data from the prediction component 230 (including a predicted trajectory determined based at least in part on output(s) of the architecture 234), and/or output(s) of the architecture 234 and may determine instructions for controlling operation of the vehicle 202 based at least in part on any of this data. In some examples, the memory 220 may further store map data 236 and this map data may be retrieved by the planning component 232 as part of generating the top-down representation of the environment discussed herein. In some examples, determining the instructions may be based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212) that the drive component(s) 212 may parse/cause to be carried out, second instructions for the emitter(s) 208 may be formatted according to a second format associated therewith). In some examples, where the planning component 232 may comprise hardware/software-in-a-loop in a simulation (e.g., for testing and/or training the planning component 232), the planning component 232 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

In some examples, the map data 236 may comprise a two-dimensional or three-dimensional representation of the environment, characteristic(s) associated therewith, and/or embedding(s). A two-dimensional representation may include, for example, a top-down representation of the environment and a three-dimensional representation may comprise position, orientation, and/or geometric data (e.g., a polygon representation, a digital wire mesh representation). Either representation may comprise a label associated with a portion of the top-down representation indicating different characteristic(s) and/or feature(s) of the environment, such as the existence and/or classification of a static object (e.g., signage, mailboxes, plants, poles, buildings, and/or the like); areas of the environment relevant to the vehicle's operations (e.g., crosswalks, drivable surfaces/roadways, turning lanes, controlled intersections, uncontrolled intersections, sidewalks, passenger pickup/drop-off zones, and/or the like); a rule of the road associated with a portion of the map data; conditional lighting data depending on the time of day/year and/or the existence and location of light sources; object characteristics (e.g., material, refraction coefficient, opacity, friction coefficient, elasticity, malleability); occlusion data indicating portion(s) of the environment that are occluded to one or more sensors of the vehicle 202; and/or the like. The occlusion data may further indicate occlusions to different classes of sensors, such as portion(s) of the environment occluded to visible light cameras but not to radar or lidar, for example. The two-dimensional representation and/or three-dimensional representation may have embeddings associated therewith that encode this data via the learned process discussed herein. For example, for a three-dimensional representation of the environment comprising a mesh, an embedding may be associated with a vertex of the mesh that encodes data associated with a face that may be generated based on one or more vertices associated with the face. For a two-dimensional representation of the environment an edge or other portion of the top-down representation may be associated with an embedding.

The memory 220 and/or 224 may additionally or alternatively store a mapping system, a planning system, a ride management system, simulation/prediction component, etc.

As described herein, the localization component 226, the perception component 228, the prediction component 230, the planning component 232, architecture 234, and/or other components of the system 200 may comprise one or more ML models. For example, localization component 226, the perception component 228, the prediction component 230, the planning component 232, and/or the architecture 234 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Figure 4:
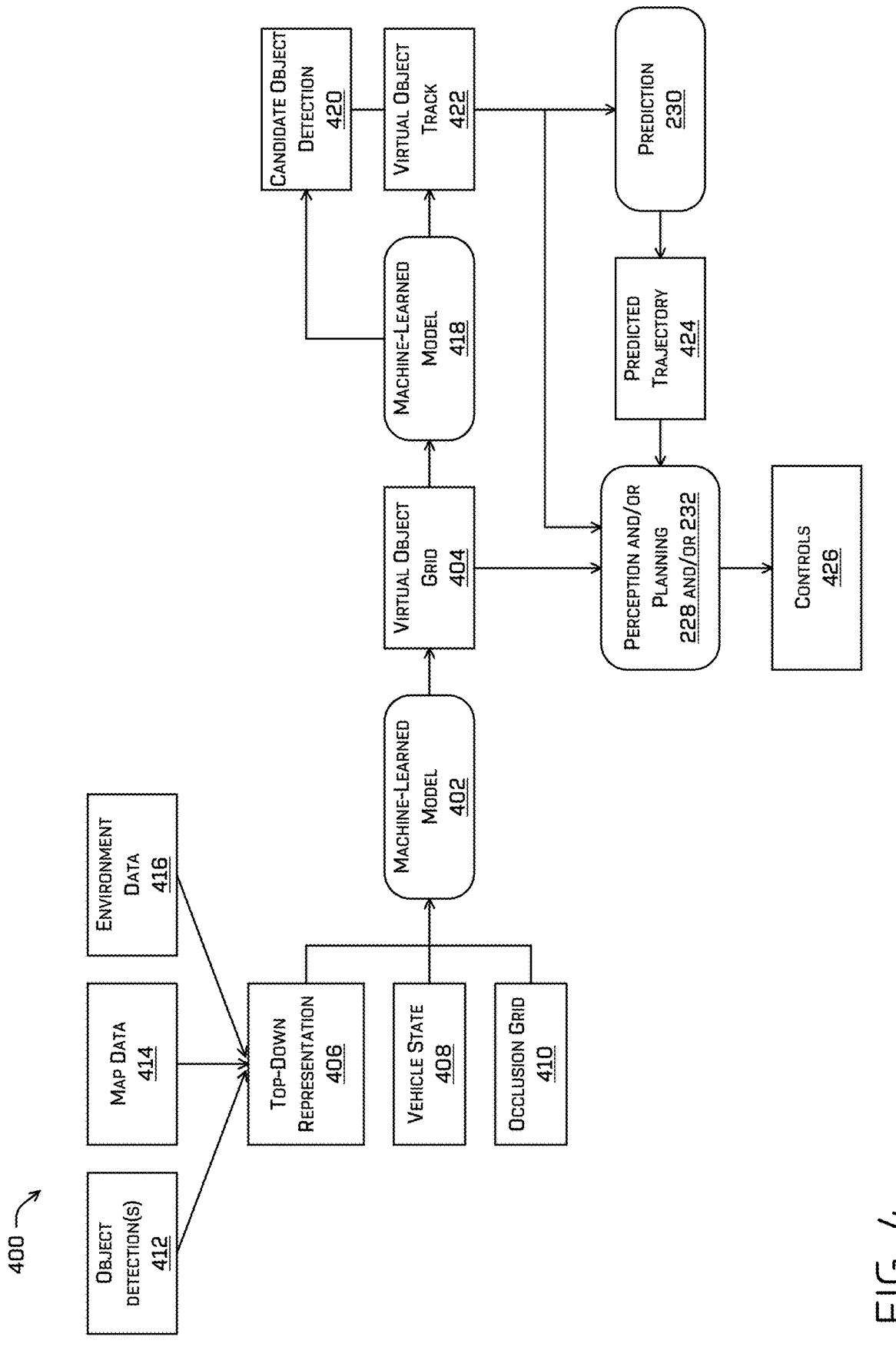
FIG. 4 illustrates a block diagram of an example architecture for generating a virtual object grid, virtual object track(s), and/or predicted trajectory for a virtual object to mitigate the risk associated with occluded objects.

In some examples, the architecture 234 may comprise machine-learned model components, such as those discussed in FIG. 4, for determining a virtual object grid, candidate object detection, virtual object track, and/or predicted trajectory associated with the virtual object. In some examples, the architecture 234 may be trained at computing device(s) 214 based at least in part on training data 238. The training data 238 may be mined from log data received from one or more vehicles. For example, the log data may include sensor data and/or perception data that may include a top-down representation of the environment, occlusion grid, vehicle state, object detection(s), object track(s), and/or the like over time. In some examples, mining the log data for the training data 238 may comprise determining log data in which an object that wasn't previously detected is newly detected. The frame of log data in which this object is detected may be added to the training data 238. Additionally or alternatively, one or more second frames that come before or after the frame in time may be added to the training data 238. The object detection in the frame (where the object newly appears and/or is newly detected) and/or following frames may be used as ground truth data and frames of log data from before the object appears may be used as input data to the architecture 234. In some examples, determining the training data 238 may additionally or alternatively comprise determining a track for the detected object for a time previous to the object's detection based at least in part on movement characteristics of the object at the time of the detection and/or following the first detection of the object. For example, determining such a track may comprise extrapolating movement characteristics of the object backward in time using movement characteristics detected as being associated with the vehicle at the time of detection and/or following the first detection of the object. In some examples, such a track may be used as part of the training data 238 and may indicate a previous position, orientation, velocity, and/or the like of the object before, at, and after the time of first detection of the object.

During training, log data from before the object was detected and/or up until a time at which the object was detected may be provided as input to the architecture 234 and the architecture 234 may output a virtual grid, candidate object detection, and/or virtual object track based at least in part on the log data. The architecture 234 may be trained based at least in part on loss(es) determined based on a difference between output of the architecture 234 and the ground truth object detection and/or object track associated with the object. For example, determining the loss(es) may comprise determining an occupancy loss based at least in part on a difference between an occupancy indicated (or not indicated) by a portion of the virtual object grid, candidate object detection, and/or virtual object track, and an occupancy indicated (or not indicated) by a portion of the ground truth in the training data, which may be the newly detected object and/or a track determined for that object. Additionally or alternatively, determining the loss(es) may comprise determining a velocity loss based at least in part on a difference between a velocity indicated by a portion of the virtual object grid, candidate object detection, and/or virtual object track and a ground truth velocity determined in association with an object detection. For example, the ground truth velocity may be indicated by the object detection and/or track in the training data 238 or the velocity may be determined based at least in part on a change of position of the object over known times as indicated by multiple object detections in the training data 238 associated with the object. Either of these losses may be separately aggregated over the entire virtual object grid, such as by averaging the occupancy losses and/or velocity losses, determining a median loss, and/or the like.

In some examples, the loss may include a cross entropy loss, L1 loss, L2 loss, Huber loss, square root of the mean squared error, Cauchy loss, or another loss function. In some examples, the loss function used for the occupancy loss may include a cross entropy and the loss function used for the velocity loss may comprise an L1 or L2 loss. A loss may be backpropagated through the component(s) of the architecture 234 discussed herein. In some examples, the occupancy loss may be propagated through the entire architecture 234, minus a component (e.g., a first output head) associated with the occupancy output of the virtual object grid and the velocity loss may be propagated through the entire architecture 234, minus a component (e.g., a second output head) associated with the velocity output of the virtual object grid. In some examples, the losses may be propagated through just machine-learned model 402. Additionally or alternatively the losses may be propagated through machine-learned model 418. Propagating the losses through a model may include altering parameter(s) of any of the components of the model using gradient descent to reduce this loss such that, if the architecture 234 repeated the process on the same input data, the resultant loss would be less than it was on the last run. This process may be repeated for multiple iterations of data, known as a training dataset. For example, the training may comprise altering one or more weights and/or biases and/or other parameter(s) of the component(s) of the architecture 234 or an individual model thereof. In some examples, some component(s) of the architecture 234 may be trained separately, such as the prediction component 230, perception component 228, and/or planning component 232.

Any type of machine-learning can be used consistent with this disclosure. For example, machine-learning models can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, U-net, Efficient-Det, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. Pat. No. 10,649,459, filed Apr. 26, 2018, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 240 (which may be a portion of the drive component(s)), which may be configured to control steering, propulsion, braking, safety, emitters, communication, and other systems of the vehicle 202. These system controller(s) may communicate with and/or control corresponding systems of the drive component(s) 212 and/or other components of the vehicle 202. For example, the planning component 232 may generate instructions based at least in part on perception data generated by the perception component 228, prediction component 230, and/or architecture 234 and transmit the instructions to the system controller(s) 240, which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Scenario

Figure 3:
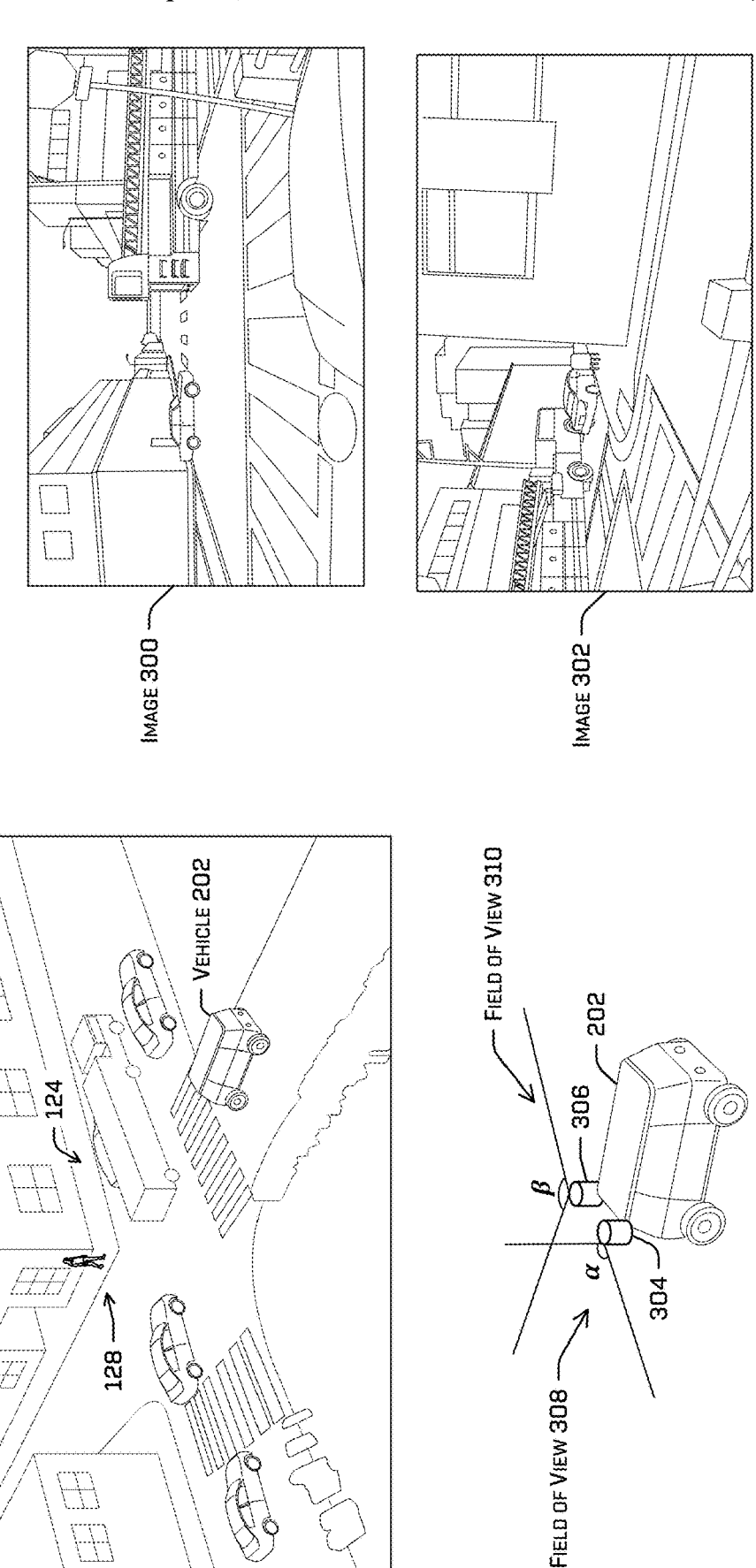
FIG. 3 illustrates an example scenario in which objects are occluded two at least two sensors of a vehicle.

FIG. 3 illustrates example scenario 100 in further detail. In example scenario 100 objects are occluded to at least two image sensors of a vehicle 202. Although FIG. 3 discusses objects being occluded to image sensors and discusses images generated by the image sensors that fail to detect the occluded objects due to their occlusion, it is understood that the concepts discussed herein are broadly applicable to other kinds of sensors, such as lidar sensors, radar sensors, ToF sensors, sonar sensors, and/or the like. Note that although the principles are more broadly applicable to other types of sensors, each type of sensor may have different properties and objects that are occluded to one type of sensor may not be occluded to another type of sensor. For example, different sensors have different limitations, attenuation constants, and/or the like, which may generally be characterized as a sensor's range, ability to detect an object through some intervening material (e.g., a solid surface, fog, or the like), etc.

In the depicted example, a pedestrian 128 and a vehicle 124 may be occluded to at least two image sensors of the vehicle 202. For example, an image 300 and an image 302 captured by two separate image sensors, camera 304 and camera 306 respectively, may not include a portion of either image that is attributable to the pedestrian 128 or the vehicle 124. In some examples, the techniques described herein may use a relative position and/or field of view 308 of the camera 304 and/or a relative position and/or field of view 310 of the camera 306 along with any objects detected by the perception component of the vehicle 202 to determine an occlusion grid. For example, the vehicle 202 may detect the fire truck and may determine an occluded region beyond the fire truck from the vehicle 202 that is occluded to image sensors of the vehicle. This occluded region may be part of an occlusion grid and may indicate that this region is occluded to image sensors, occluded to camera 304 and camera 306, or the like. In some examples, the occlusion grid may additionally or alternatively indicate a region that is occluded to a different type of sensor, such as radar, which may be a smaller region than the region occluded to image sensors because of the fire truck. For example, radar may be able to detect some objects beyond the fire truck. Accordingly, the occlusion grid may include multiple layers, where each layer indicates the occluded region(s) for a type of sensor or occluded to a particular sensor. Additionally or alternatively, the occlusion grid may indicate occlusion regions for all the types of sensors deployed on the vehicle 202. In such an example, the occlusion grid may indicate any occluded regions that aren't detectable by any type of sensor. In other words, such an occlusion grid may indicate a union of different occupancy grids associated with different individual sensors and/or different sensor types. An example occlusion grid 142 is depicted in FIG. 1.

Example Machine-Learned Architecture for Generating Diverse Time-Invariant Object Path Predictions FIG. 4 illustrates a block diagram of an example architecture 400 for generating a virtual object grid, candidate object detection, virtual object track(s), and/or predicted trajectory for a virtual object to mitigate the risk associated with an occluded object. Example architecture 400 may comprise architecture 234 and/or additional component(s) of the vehicle 202 as discussed herein. In some examples, a vehicle 202 may be configured with, store, and/or operate example architecture 400.

In some examples, the example architecture 400 may comprise a first machine-learned model 402 that may determine a virtual object grid 404 based at least in part on a top-down representation 406 of an environment that includes the vehicle, a vehicle state 408, and/or an occlusion grid 410. In some examples, the vehicle state 408 and/or occlusion grid 410 may be included as part of the top-down representation 406, although in additional or alternate examples, they may be separate input to the first machine-learned model 402. The vehicle state 408 may indicate a state of the vehicle 202 at a specific time. For example, this state may indicate a position, orientation, velocity, acceleration, steering rate, steering angle, and/or the like associated with the vehicle 202. As discussed above, the occlusion grid 410 may indicate region(s) of the environment that are occluded to one or more individual sensors and/or one or more types of sensors.

In some examples, a perception component 228 of the vehicle may determine the top-down representation 406 based at least in part on object detection(s) 412 generated by the perception component, map data 414 (which may comprise or represent map data 236 and may be map data associated with a region surrounding the vehicle 202, and/or environment data 416, which may be determined based at least in part on sensor data and/or may be received as a separate indication from a remote server. For example, environment data 416 may indicate a state associated with a feature of the map or the environment generally, such as a traffic light state, existence of a construction zone, a weather condition, a lane closure or directionality, a bridge status, a toll status, effective sensor range, and/or the like. As discussed above, the top-down representation may comprise a data structure, such as an image, that encodes or otherwise represents the object detection(s) 412, map data 414, and/or environment data 416. In some examples, the top-down representation 406 may additionally or alternatively encode and/or otherwise represent the vehicle state 408 and/or occlusion grid 410 as part of the top-down representation. In some examples, the top-down representation may spatially indicate this data in a manner that associates any of the data indicated by the top-down representation with a portion of the environment, such as in a top-down or birds-eye view of the environment. In some examples, input data (e.g., top-down representation 406, vehicle state 408, and/or occlusion grid 410) may comprise multiple input data associated with multiple times, such as input data for a current time, t, and input data determined for k time steps back to a past time, t-n. In some examples, the top-down representation 406 may additionally or alternatively include raw sensor data.

In some examples, the top-down representation may include a data structure, such as an image, where each pixel is associated with one or more channels indicating different characteristics of the environment, such as object detection data, map data, general environment data, and/or the like. For example, instead of indicating color data, a pixel of the top-down representation may indicate object data, map data, and/or general environment data, each of which may be associated with one or more channels of the image. The object detection(s) 412 indicated in the top-down representation 406 may comprise object detection data associated with an object and/or any other objects that have been detected by the perception component, along with their attendant data, such as likelihood(s) (e.g., posterior probability(ies) indicating an estimate of the accuracy of the data with which a posterior probability is associated), object classification (e.g., pedestrian, cyclist, vehicle, construction zone, static (immovable)/dynamic (movable) object), velocity, acceleration, orientation, and/or the like. Using the top-down representation 406 as part of the input to the first machine-learned model 402 allows the virtual object grid 404 determined by the first machine-learned model 402 to be conditioned on the various data indicated in the top-down representation 406, which could include things like the existence of other objects, object tracks, lane locations, lane directionality, various map features, environment state(s), and/or the like. In some examples, the top-down representation may be replaced with a three-dimensional representation of the environment or a tensor or vector.

In some examples, the first machine-learned model 402 may be trained to use this input data to determine a virtual object grid 404. The virtual object grid 404 may indicate a field of occupancy likelihoods, which may be indicated as logits output by an occupancy output head of the first machine-learned model 402, and/or velocities, which may indicate direction and magnitude of the velocity and may be output by a velocity output head of the first machine-learned model 402. Additionally or alternatively, the virtual object grid 404 may indicate an occupancy likelihood as a probability mass function or a probability density function. In some examples, the occupancy output head may additionally or alternatively output multiple likelihoods, each associated with a different object classification and may softmax the likelihoods to determine an occupancy likelihood and object classification to output. Additionally or alternatively, the occupancy output head may output any likelihoods that meet or exceed a threshold likelihood. In yet an additional or alternate example, the first machine-learned model 402 may output a virtual object grid 404 or layer thereof per object classification—a first virtual object grid or layer of a virtual object grid for indicating vehicles (e.g., any vehicle occupancy likelihoods that meet or exceed a threshold likelihood), a second virtual object grid or layer of a virtual object grid for indicating pedestrians, and so on. Additionally or alternatively, in an example where the predicted occupancy of different object classifications are indicated in a same virtual object grid 404, the virtual object grid 404 may additionally indicate an object classification associated with the occupancy likelihood and/or the portion of the environment that is predicted to be occupied.

In some examples, the first machine-learned model 402 may comprise an image-to-image prediction model, such as U-net or the like. In some examples, the virtual object grid 404 may comprise a top-down image of the environment that indicates occupancy likelihoods and velocities for each portion of the occupancy grid. For example, a portion of the occupancy grid, such as a pixel, may indicate a likelihood that a portion of the environment corresponding with the portion of the virtual object grid is occupied by an object or occupied by an object of a particular object classification and a velocity associated with the portion of the environment. Even though some areas of the environment may not be occupied by an object, a velocity may still be output for those unoccupied portions. Ultimately, those velocities may ultimately be ignored or suppressed if they aren't associated with a region or portion of the environment indicated by occupancy likelihood(s) as being associated with an object or virtual object (i.e., a portion or region that has occupancy likelihood(s) that meet or exceed a threshold likelihood). In some examples, the first machine-learned model 402 may additionally or alternatively comprise a second occupancy output head that may output a likelihood associated with an occluded region that indicates a likelihood that the occluded region includes at least one object or may output an indication of a number of objects predicted to lie within the region, where the number output by the second occupancy output head may be 0 or more.

In some examples, the first machine-learned model 402 may be trained to condition determining an indication that a portion of the top-down representation is occupied by an occluded based at least in part on an object classification and/or map data. For example, the top-down representation may be trained such that it is more likely that the first machine-learned model 402 indicates that a pedestrian will occupy a space proximate to an object classified as vehicle or occupy space on a driveway, sidewalk, or the like and be less likely to occupy the middle of a road that has no crosswalk associated therewith. Similarly, a size of an occluded region, behavior of other detected objects (e.g., if other objects are stopping near a crosswalk indicated in the map data 414 but the crosswalk is occluded, the firsts machine-learned model 402 may be conditioned to output increased likelihoods that a pedestrian is in the crosswalk), and/or the like may similarly condition the output of the first machine-learned model 402. However, this is not explicitly trained and may be the result of the training techniques discussed herein and the specific data discussed herein as being used as input by the machine-learned model 402.

The virtual object grid 404 may comprise a single virtual object grid associated with a current time or multiple virtual object grids associated with previous time(s) (e.g., back to time t-n as one example, although the time may be different), a current time, and/or future time(s). In other words, the virtual object grid 404 may determine a current, historical, and/or predicted state of a virtual object, i.e., an occluded object that the first machine-learned model 402 predicts as existing. Such an object may be an object that the vehicle has not previously detected within a previous time period or an object that has momentarily been occluded, such as an object that the vehicle 202 detected but that has disappeared from view of sensor(s) of the vehicle 202.

In some examples, the virtual object grid 404 may be provided as input to a second machine-learned model 418, which may be a post-processing component that determines a candidate object detection 420 and/or virtual object track 422. The candidate object detection 420 may indicate object detection data associated with a virtual object. For example, the candidate object detection 420 may have a same format as a nominally generated object detection, such as an object detection generated by the perception component 228 for an object that is not occluded. Accordingly, the candidate object detection 420 may indicate a region occupied by the virtual object, a region of interest associated with the virtual object (e.g., an anchor, object proposal, shape and/or extents, bounding shape, bounding box), an object classification associated with the object, and/or a position, orientation, velocity, and/or acceleration of the virtual object. The candidate object detection 420 may be a candidate in that it hasn't been confirmed as existing by the perception component 228 or perception data received from another vehicle. The candidate object detection 420 may continue to be indicated as a candidate object detection until such confirmation is determined or received from another vehicle.

The virtual object track 422 may, in essence, indicate a series of candidate object detections over time from a historical time to a current time. In some examples, the historical time may be an oldest time for which a candidate object detection was generated for the virtual object. For example, the virtual object grid 404 may comprise multiple virtual object grids associated with a current time and one or more previous times. A candidate object detection generated for an oldest of those previous times may be used to determine a portion of the virtual object track 422 associated with the oldest time. Moreover, the second machine-learned model 418 may persistently output a candidate object detection 420 associated with a virtual object over time. Accordingly, the oldest time may be the oldest time associated with a virtual object grid generated for the virtual object the first time the virtual object has a candidate object detection generated for it. In some examples, the oldest time associated with the virtual object track 422 may be limited to a maximum oldest time. To give a concrete example, if virtual object grids are generated for times from a current time to a time 5 seconds ago, candidate object detections may be generated for each of the virtual object grids generated at the different time steps between the current time and the time 5 seconds ago (e.g., where the time step is 1 second, that would result in 6 virtual object grids). If the second machine-learned model 418 continues to output candidate object detections associated with the same object for another 20 seconds, the oldest time may be the time 5 seconds before the candidate object detection for the object detection first being generated. Accordingly, the track could include 25 seconds worth of candidate object detections. In an example where the tracks are limited to a maximum oldest time, the track may be limited to 10, 15, 20, 30 seconds, or any other length of time. In an additional or alternate example, the tracks may be unlimited.

In some examples, the virtual object track 422 may associate candidate object detections generated at different times as being associated with the same object or the virtual object track 422 may be determined by a machine-learned model based at least in part on the candidate object detections. In the latter example, the object track 422 may be an amalgamation of the candidate object detections that the machine-learned model is trained to correct errors for and minimize differences between subsequently generated candidate object detections.

In some examples, determining a candidate object detection by the second machine-learned model 418 using a virtual object grid associated with a particular time may comprise suppressing any occupancy likelihoods (e.g., logits) that are less than a threshold likelihood (e.g., 0.5, 0.7, any other suitable number), blurring the remaining likelihoods (e.g., using Gaussian blur) as a blurred representation, then using a set of learned layers (e.g., one or more connected layers, a multi-layer perceptron (MLP), a perceptron pyramid, or the like) to determine the candidate object detection (e.g., the ROI, position, orientation, and/or velocity). For example, the set of learned layers could comprise a machine-learned model such as a computer vision detection model such as EfficientDet, a ResNet, ConvNeXt, or the like. Such a model may output a region, ROI, and/or orientation predicted to be associated with the virtual object. Additionally or alternatively, the second machine-learned model 418 may be a clustering machine-learned model that determines clusters of occupancy likelihoods to determine the region, ROI, and/or orientation of the virtual object or the second machine-learned model 418 may comprise a computer vision model of any kind (e.g., EfficientDet, a ResNet, ConvNeXt, or the like) that detects the object. In some examples, the second machine-learned model 418 may be trained to additionally determine (e.g., by another output head) a confidence score (e.g., a probability) that the candidate object detection 420 is a true positive.

A post-processing component may determine a velocity associated with the candidate object detection by determining an average or median of velocities output by the first machine-learned model 402 associated with the region or ROI indicated by the candidate object detection in the virtual object grid 404. Additionally or alternatively, the virtual object grid 404 may be an intermediate feature map that is provided as input to an output head or MLP that determines the candidate object detection 420 and/or virtual object track 422 as a final part of the first machine-learned model 402. In some examples, the second machine-learned model 418 may determine the virtual object track by applying the process above to multiple virtual object grids that were generated by the second machine-learned model 418 for different time steps into the past to determine a current and historical set of ROIs, positions, orientations, and/or velocities of the virtual object over time from t-n to the current time, t.

In some examples, the velocity component of the candidate object detection and/or virtual object track may be determined based at least in part on the velocities indicated by the virtual object grid within the ROI of the candidate object detection. For example, the post-processing component may determine an average or median of the velocities within the ROI or a machine-learned component may determine the velocity to associate with the object detection and/or virtual object track based at least in part on aggregating the velocities within the ROI using learned layers of the machine-learned component.

In some examples, the candidate object detection 420 and/or the virtual object track 422 may be provided to the prediction component 230 for the prediction component 230 to determine a predicted trajectory 424 associated with the virtual object. Since the candidate object detection 420 and the virtual object track 422 may have a same format and/or data structure as nominal object detections and tracks (i.e., for objects that were not occluded and were detected by the perception component), the prediction component 230 may determined the predicted trajectory 424 just like the virtual object was an object that isn't occluded and that was detected by the perception component 228. The prediction component 230 may comprise a kinematics model and/or machine-learned model(s) (e.g., a Kalman filter, neural network). See U.S. patent application Ser. No. 17/508,811, filed Oct. 22, 2021, the entirety of which is incorporated by reference herein for all purposes. The predicted trajectory 424 may indicate predicted future position(s), orientation(s), velocity(ies), and/or acceleration(s) of the virtual object based at least in part on the candidate object detection 420 and/or the virtual object track 422. In some examples, the prediction component 230 may additionally be trained to determine (e.g., by an additional output head) a confidence score (e.g., a probability) associated with the predicted trajectory 424. The prediction component 230 may then provide the predicted trajectory 424 to the planning component 232 for use by the planning component 232 to determine a trajectory for controlling the vehicle. In some examples, predicted trajectory(ies) determined for virtual objects may be indicated as being associated with a virtual object since it may be less likely that the virtual object exists than a nominally detected object, which the planning component 232 may then account for in determining a trajectory for controlling the vehicle.

In some examples, the virtual object grid 404 may be provided to the perception component 228 and/or the planning component 232. For example, the perception component may use the virtual object grid 404 to determine a candidate object detection and/or virtual object track (although in some examples, the second machine-learned model 418 may do this) or may use a subsequently received object detection generated by the perception component 228 to indicate that a candidate object detection and/or virtual object track is a false positive or true positive. Determining that a candidate object detection and/or virtual object track is a false positive or true positive may comprise determining that a region of the environment that was formerly occluded and was determined to include a virtual object (i.e., by a candidate object detection) is no longer occluded due to vehicle 202 movement and/or movement of another object in the environment. Determining the candidate object detection is a false positive may comprise determining, based on the formerly occluded region of the environment including the candidate object detection, that no object was detected that is within a threshold distance of the candidate object detection and/or a virtual object track associated therewith. Whereas, determining the candidate object detection may comprise detecting an object in the formerly occluded region that is within a threshold distance of the candidate object detection. Additionally or alternatively, the true positive/false positive determination may be based at least in part on an object detection (or lack thereof) determined by a different vehicle to which the occluded region is not occluded for the other vehicle. These true positive/false positive indications may be transmitted to a remote computing device for use as part of training data for training or refining the first machine-learned model 402 and/or the second machine-learned model 418.

If the perception component confirms that a candidate object detection is a true positive, the perception component may instantiate a track associated with the newly detected object (that was correctly detected as an occluded (virtual) object) using the virtual object track 422. For example, upon detecting an object, the perception component may determine whether the newly detected object is associated with a candidate object detection and/or virtual object track by comparing the candidate object detection, virtual object track, and/or predicted trajectory to object detection data for the newly detected object. For example, the perception component may determine a difference between the detected position, orientation, and/or velocity of the newly detected object to a position, orientation, and/or velocity indicated by the candidate object detection, virtual object track, and/or predicted trajectory.

If the difference(s) are less than respective threshold difference(s) or if more than a threshold number of the differences are less than their respective threshold differences, the perception component may indicate that the newly detected object was a virtual object predicted by the machine-learned model discussed herein. In that case, the perception component may use the virtual object track to initialize an object track associated with the newly detected object. This is highly useful because without the virtual object data determined by the machine-learned model discussed herein, a newly detected object would not have an object track since there are no historical object detection(s) associated with the newly detected objects. Accordingly, other techniques might rely on a heuristic object track that retroactively estimates an object track for the newly detected object based on its current movement or the other techniques may merely allow subsequent detections of that same object to build an object track for the object. In some examples, initializing the object track for the newly detected object may comprise modifying the virtual object track based at least in part on the current object detection data to account for any errors in the virtual object track, such as by modifying previous position(s), orientation(s), and/or velocity(ies) to better align with the object detection data determined for the newly detected object.

The planning component 232 may use the virtual object grid 404 as part of a cost map for determining a cost associated with a candidate trajectory for controlling the vehicle. Additionally or alternatively, the planning component 232 may use the candidate object detection 420 and/or predicted trajectory 424 as part of determining a cost for a candidate trajectory. For example, the cost may be based at least in part on a proximity the vehicle 202 would be to the candidate object detection 420 and/or the predicted trajectory 424 if the vehicle 202 were to execute the candidate trajectory. The cost may additionally or alternatively be based at least in part on other metrics that may be based at least in part on the candidate object detection 420 and/or the predicted trajectory 424. For example, the cost may be based at least in part on lateral and/or longitudinal acceleration required by the virtual object to avoid the vehicle 202 or for the vehicle 202 to avoid the virtual object, safety of the vehicle 202 and/or passenger(s) thereof in executing the candidate trajectory based at least in part on the candidate object detection 420 and/or the predicted trajectory 424, etc. In some cases, the candidate object detection 420 and/or the virtual object track 422 may be used by the planning component 232 to perform an evasive maneuver to avoid a collision with the virtual object, such as when the virtual object is determined to be likely to disocclude in front of the vehicle (e.g., if a confidence score associated with the candidate object detection 420 and/or a confidence score associated with the predicted trajectory 424 meets or exceeds a threshold confidence score). In some examples, the planning component 232 may output the trajectory determined based at least in part on the cost(s) associated with different candidate trajectory as controls 426 for effectuating the trajectory determined by the planning component 232.

Example Top-Down Representation and Example Virtual Object Grid

Figure 5:
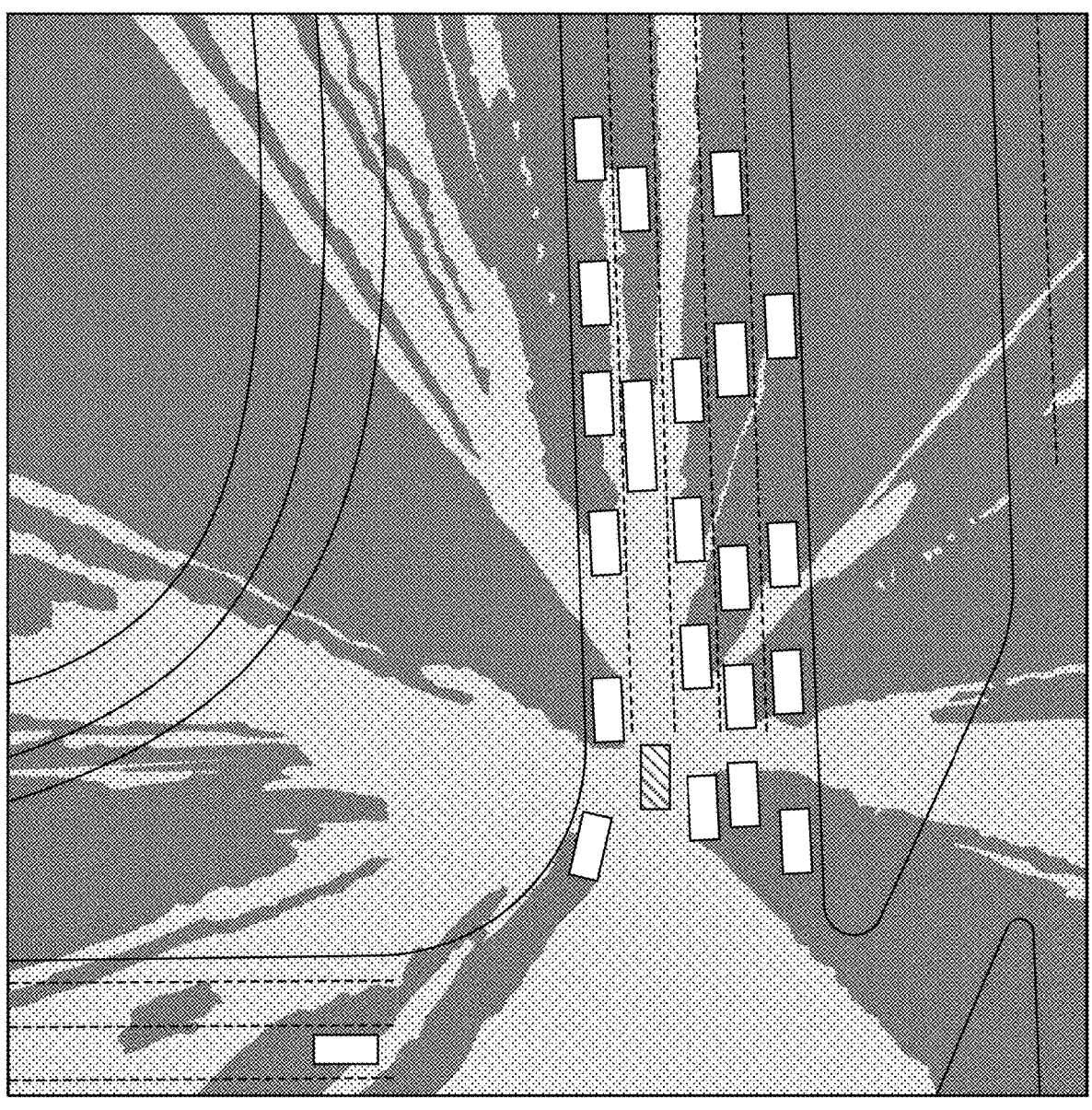
FIG. 5 illustrates an example top-down representation of a scenario in which a variety of objects have been detected by the vehicle and an occlusion grid has been determined by the vehicle.

FIG. 5 illustrates an example top-down representation 500 of a scenario in which a variety of objects have been detected by the vehicle and an occlusion grid has been determined by the vehicle. The example top-down representation 500 depicts detected objects (vehicles, in this example) as white rectangles. The example top-down representation 500 further includes an occlusion grid, where occluded regions are depicted in dark gray shading and non-occluded regions are depicted in light gray shading. The example top-down representation 500 further comprises a vehicle state, depicted as a diagonally-hashed rectangle. The example top-down representation 500 further comprises map data indicated as lines and dashed lines to indicate roadway edges, lanes, and other features of the environment. Accordingly, example top-down representation 500 is an example of input data that may be used by the architecture 234 discussed herein to determine a virtual object grid. Note that the example representation is not meant to be limiting and cannot adequately depict a variety of additional data that may be included in the map data, object detections, top-down representation, and vehicle state data. For example, the example top-down representation 500 does not depict object velocities (orientation is implied by their relative orientations in the top-down representation), lane directionality, detailed map features (e.g., the existence of traffic control features, crosswalks, sidewalks), etc.

Figure 6:
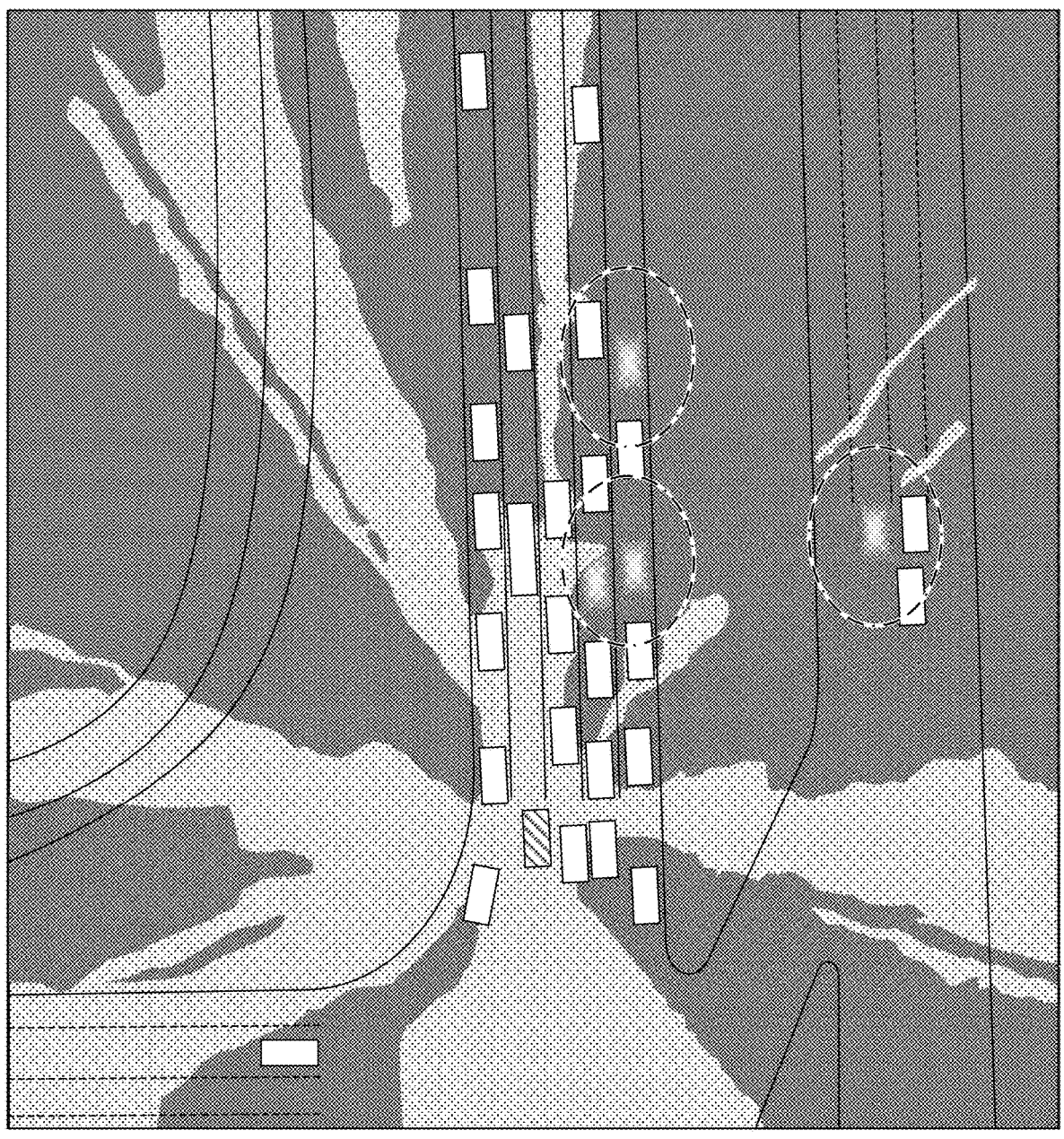
FIG. 6 illustrates an example virtual object grid generated based at least in part on the top-down representation of the scenario depicted in FIG. 5. The virtual object grid comprises depictions of four virtual objects within occluded regions determined by the vehicle as part of the occlusion grid.

FIG. 6 illustrates an example virtual object grid 600 generated based at least in part on the top-down representation of the scenario depicted in FIG. 5 and/or the other input data discussed herein. The example virtual object grid 600 comprises depictions of four virtual objects within occluded regions determined by the vehicle as part of the occlusion grid. The four virtual objects are circled to help highlight them and are indicated as gradient-filled rectangles since the virtual object grid may indicate occupancy likelihoods as part of the virtual object grid. In other words, such virtual objects may be more smeared or blob-like in appearance than other object detections in the top-down representation due to the virtual object grid indicating occupancy as logits or some other likelihood. The example virtual object grid 600 only depicts occupancy likelihoods that meet or exceed a threshold likelihood. Note that the velocity component of the virtual object grid is not depicted, but would comprise a flow field where each portion of the virtual object grid may indicate a velocity. Note that the virtual objects appear in regions of the environment that are occluded to sensor(s) of the vehicle 202. In the depicted example, three of the virtual objects exist in a queue of vehicles and wouldn't otherwise be detectable by the vehicle 202 without movement of the vehicle 202 and/or one or more objects that occlude the virtual objects.

Example Process

Figure 7:
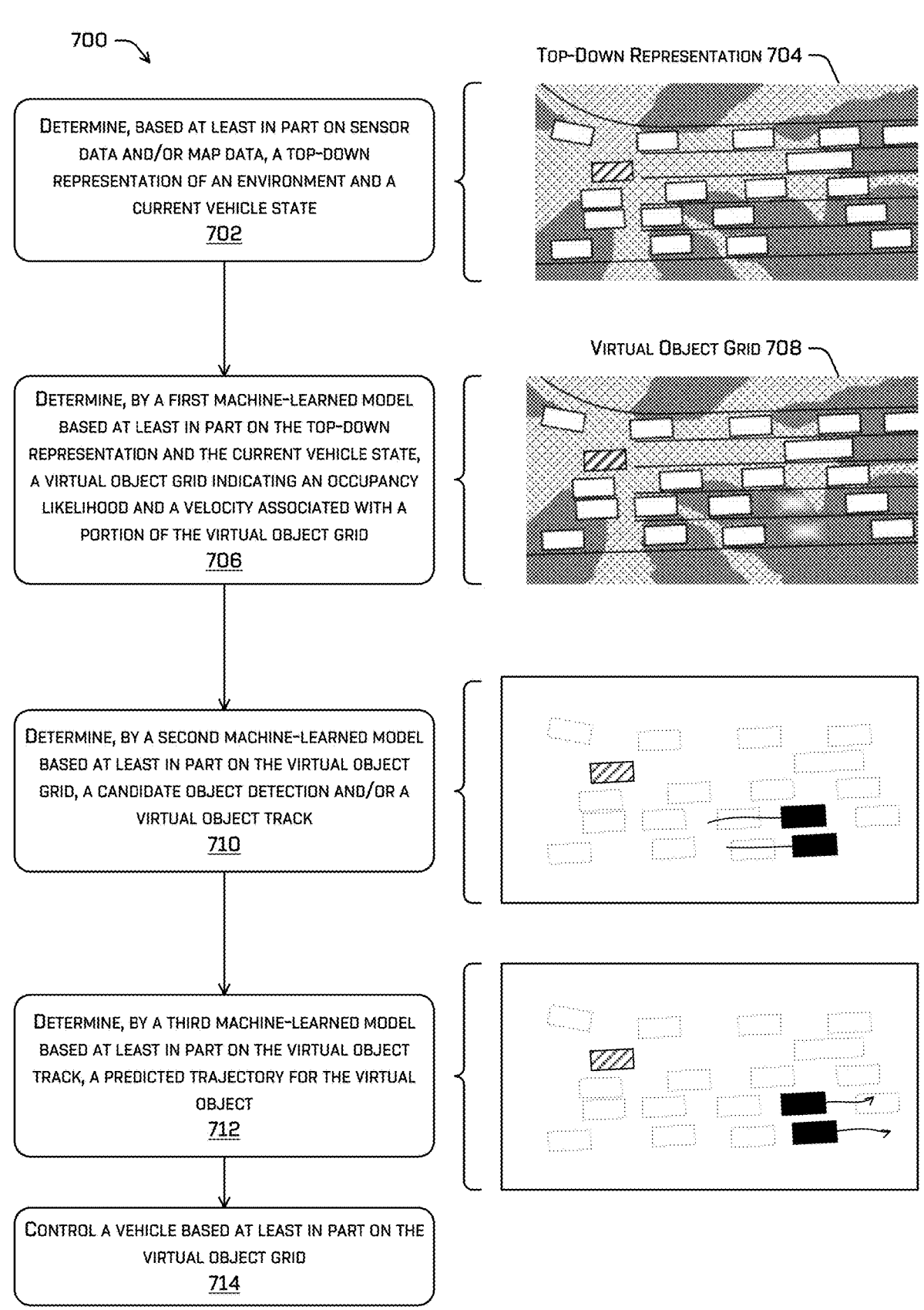
FIG. 7 depicts a pictorial flow diagram of an example process for determining a virtual object grid, candidate object detection, virtual object track, and/or predicted trajectory for a virtual object.

FIG. 7 depicts a pictorial flow diagram of an example process 700 for determining a virtual object grid, candidate object detection, virtual object track, and/or predicted trajectory for a virtual object. Example process 700 may be executed by a vehicle 202, such as by an architecture 400. In some examples, a perception component, prediction component, and/or planning component of the vehicle 202 may execute some or part of the operations.

At operation 702, example process 700 may comprise determining, based at least in part on sensor data and/or map data, a top-down representation of an environment and a current vehicle state, according to any of the techniques discussed herein. In some examples, a perception component of the vehicle 202 may determine at least part of the top-down representation. For example, the perception component may determine object detection(s) that may be used to generate part of the top-down representation. The top-down representation may further comprise an occlusion grid that is determined by the vehicle 202 based at least in part on object detection(s), map data, and/or relative position(s), field(s) of view, and/or characteristics of one or more sensors of the vehicle 202. In some examples, determining the occlusion grid may comprise a ray-tracing process that is based on a sensor's relative position and field of view and one or more object detections or other obstructions identified in the map data (e.g., buildings, signage, other static objects). Additionally or alternatively, a neural network or another suitable machine-learned model may determine the occlusion grid based at least in part on sensor data, object detection data, and/or map data. In an additional or alternate example, the occlusion grid may be separately determined and provided as input to a first machine-learned model. In some examples, the vehicle state may be determined based at least in part on localization data determined by a localization component of the vehicle using the sensor data and SLAM techniques. In some examples, multiple top-down representations, vehicle states, and/or occlusion grids may be determined in association with multiple times from a previous time to a current time.

FIG. 7 depicts an example top-down representation 704 that is part of the example top-down representation 500 depicted in FIG. 5. Note that at least part of the vehicle 202 state is depicted as a diagonally-hashed rectangle, i.e., the diagonally-hashed rectangle depicts at least the vehicle's position and orientation.

At operation 706, example process 700 may comprise determining by a first machine-learned model based at least in part on the top-down representation and the current vehicle state (and the occlusion grid if that is provided separately), a virtual object grid, according to any of the techniques discussed herein. In some examples, the first machine-learned model 402 may determine the virtual object grid. As discussed above, the virtual object grid may indicate an occupancy likelihood and a velocity associated with a portion of the virtual object grid. The portion of the virtual object grid may be associated with a portion of the environment and a portion of the top-down representation. In some examples, multiple virtual object grids may be determined in association with multiple times from a previous time to a current time. The previous time may be a same or different time than the previous time associated with the input data. In some examples, the multiple virtual object grids may additionally or alternatively comprise one or more future times as a predicted state of the environment that includes any predicted virtual object states. FIG. 7 depicts an example virtual object grid 708 that is part of the example virtual object grid 600 depicted in FIG. 6. Two virtual objects are depicted in the virtual object grid 708 as gradient-filled rectangles, although in practice a virtual objects may be a region of occupancy logits that meet or exceed a threshold occupancy or a candidate object detection generated based thereon (e.g., at operation 710).

At operation 710, example process 700 may comprise determining, by a second machine-learned model based at least in part on the virtual object grid, a candidate object detection and/or a virtual object track, according to any of the techniques discussed herein. FIG. 7 depicts two candidate object detections generated by the second machine-learned model as black rectangles and the virtual object tracks associated therewith as lines trailing from the candidate object detections that indicate previous positions of the candidate object detections. Note that although just a line is depicted as the track any of the data associated with a candidate object detection may also be indicated by the track. For example, the track may indicate current and/or historical position, orientation, velocity, acceleration, object classification, etc. associated with the virtual object/candidate object detection. For example, the second machine-learned model 418 may determine the candidate object detection 420 and/or virtual object track 422 based at least in part on the virtual object grid 404, which may comprise multiple object grids over time from a historical time to a current time and/or a historical time to a future time.

At operation 712, example process 700 may comprise determining, by a third machine-learned model based at least in part on the candidate object detection and/or virtual object track, a predicted trajectory for the virtual object, according to any of the techniques discussed herein. The predicted trajectories for the candidate object detections/virtual objects are depicted as arrows originating from the candidate object detections. A predicted trajectory may indicate predicted (future) position(s), orientation(s), velocity(ies), and/or acceleration(s) associated with a candidate object detection. In some examples, a prediction component of the vehicle may determine a predicted trajectory for a virtual object based at least in part on the candidate object detection and/or virtual object track.

At operation 714, example process 700 may comprise controlling a vehicle based at least in part on the virtual object grid, according to any of the techniques discussed herein. For example, operation 714 may comprise determining a cost associated with a candidate action based at least in part on the virtual object grid and/or a candidate object detection, virtual object track, and/or predicted trajectory determined based thereon. Operation 714 may further comprise determining a candidate trajectory, from among multiple candidate trajectories and costs associated therewith, to implement by the vehicle. For example, a tree search may determine that the candidate trajectory is associated with a cost that is a lowest cost among the multiple costs associated with the multiple candidate trajectories or that the cost is below a threshold cost. The tree search may use the cost in additional or alternate techniques for determining which candidate trajectory to select or implementation by the vehicle, as discussed in further detail in U.S. Patent Application Publication No. 2023-0041975, filed Aug. 4, 2021 and U.S. patent application Ser. No. 18/084,419, filed Dec. 19, 2022, the entirety of which are incorporated by reference herein for all purposes. Regardless, a planning component of the vehicle may use the virtual object grid or any of the data derived therefrom according to the techniques discussed herein to determine a trajectory for controlling the vehicle. Additionally or alternatively, a perception component of the vehicle may confirm a virtual object as a true positive or indicate that the virtual object was a false positive, either indication of which may be supplied to the planning component, either by suppressing or deleting data associated with a false positive virtual object or transmitting an indication that the virtual object is a true positive or transmitting an object detection, object track, and/or predicted trajectory to the planning component that is based at least in part on confirming the virtual object as a true positive. In some examples, the predicted trajectory determined for a virtual object may be updated if the virtual object is confirmed as a true positive based at least in part on an object track initialized for the object based at least in part on the virtual object track. In other words, the new object detection and/or object track that may be associated with the newly detected object that was formerly detected as a virtual object may be used to determine a new (updated) predicted trajectory for the object and used by the planning component as part of controlling the vehicle.

Example Clauses

A. A system comprising: one or more processors; and non-transitory memory storing processor-executable instructions that, when executed by the one or more processors, cause the system to perform operations comprising: determining, based at least in part on at least one of sensor data or map data, a top-down representation of an environment in which a vehicle is operating and a current vehicle state of the vehicle, the top-down representation including the map data and a region of the environment occluded to one or more sensors of the vehicle; determining, by a first machine-learned model and based at least in part on the top-down representation and the current vehicle state, a virtual object grid, wherein a portion of the virtual object grid indicates: a likelihood that an occluded object or newly disoccluded object exists at a portion of the environment corresponding with the portion of the virtual object grid, and a velocity associated with the portion of the virtual object grid; determining, by a second machine-learned model based at least in part on the virtual object grid, a virtual object track indicating a candidate object detection and a current and historical at least one of position, orientation, velocity, acceleration, region of interest, or classification associated with the candidate object detection; and determining, by a third machine-learned model based at least in part on the virtual object track, a predicted trajectory associated with the candidate object detection; and controlling the vehicle based at least in part on the virtual object track and the predicted trajectory.

B. The system of paragraph A, wherein determining the virtual object track by the second machine-learned model is based at least in part on: a second output head of the first machine-learned model that determines the virtual object track based at least in part on the virtual object grid; or the second machine-learned model determines the virtual object track based at least in part on: determining a subset of the virtual object grid that comprises likelihoods that meets or exceeds a threshold likelihood; and determining, by one or more machine-learned layers based at least in part on the subset, at least one of a region of interest, position, orientation, or velocity associated with the candidate object detection.

C. The system of either paragraph A or B, wherein: the top-down representation comprises multiple top-down representations, each associated with different times from a current time to a time in the past; and the virtual object grid comprises multiple virtual object grids, each associated with different times from the current time to at least one of the time in the past or a time in the future.

D. The system of any one of paragraphs A-C, wherein the operations further comprise: receiving second sensor data; and either: determining, by a perception component of the vehicle, an object detection associated with the candidate object detection; and affirming the candidate object detection as a true positive; or determining, by the perception component of the vehicle, no object exists associated with the candidate object detection; and suppressing the candidate object detection as a false positive.

E. The system of paragraph D, wherein the operations of paragraph D comprise affirming the candidate object detection as a true positive and the operations further comprise initializing an object track associated with the object detection based at least in part on the virtual object track.

F. One or more non-transitory computer-readable media storing processor-executable instructions that, when executed by one or more processors, perform operations comprising: receiving at least one of sensor data or map data associated with an environment in which a vehicle is operating and a current vehicle state of the vehicle; determining, by a first machine-learned model and based at least in part on the current vehicle state and at least one of the sensor data or map data, a virtual object grid, wherein a portion of the virtual object grid indicates: a likelihood that an occluded object or newly disoccluded object exists at a portion of the environment corresponding with the portion of the virtual object grid, and a velocity associated with the portion of the virtual object grid; determining, by a second machine-learned model based at least in part on the virtual object grid, a virtual object track indicating a candidate object detection and a current and historical at least one of position, orientation, velocity, acceleration, a region of interest, or classification associated with the candidate object detection; and controlling the vehicle based at least in part on the virtual object track.

G. The one or more non-transitory computer-readable media of paragraph F, wherein the first machine-learned model and the second machine-learned model are part of a single machine-learned model.

H. The one or more non-transitory computer-readable media of paragraph G, wherein determining the virtual object track by the second machine-learned model is based at least in part on: a second output head of the first machine-learned model that determines the virtual object track based at least in part on the virtual object grid; or the second machine-learned model determines the virtual object track based at least in part on: determining a subset of the virtual object grid that comprises likelihoods that meets or exceeds a threshold likelihood; and determining, by one or more machine-learned layers based at least in part on the subset, at least one of a region of interest, position, orientation, or velocity associated with the candidate object detection.

I. The one or more non-transitory computer-readable media of either paragraph G or H, wherein: the sensor data comprises multiple sets of sensor data, each associated with different times from a current time to a time in the past; and the virtual object grid comprises multiple virtual object grids, each associated with different times from the current time to at least one of the time in the past or a time in the future.

J. The one or more non-transitory computer-readable media of any one of paragraphs G-I, wherein the operations further comprise: receiving second sensor data; and either: determining, by a perception component of the vehicle, an object detection associated with the candidate object detection; and affirming the candidate object detection as a true positive; or determining, by the perception component of the vehicle, no object exists associated with the candidate object detection; and suppressing the candidate object detection as a false positive.

K. The one or more non-transitory computer-readable media of paragraph J, wherein at least one of true positive or the false positive are used as part of refining of at least one of the first machine-learned model, the second machine-learned model, or the third machine-learned model.

L. The one or more non-transitory computer-readable media of paragraph J, wherein the operations of paragraph J comprise affirming the candidate object detection as a true positive and the operations further comprise initializing an object track associated with the object detection based at least in part on the virtual object track.

M. The one or more non-transitory computer-readable media of any one of paragraphs G-L, wherein training the first machine-learned model comprises: determining a set of log data comprising log data indicating that an object detection was determined for an object that was not detected at a first time immediately previous to a second time; determining a first loss based at least in part on a difference between an occupancy output of the first machine-learned model and an occupancy region indicated by the object detection; determining a second loss based at least in part on a difference between a velocity output of the first machine-learned model and a velocity associated with the object detection determined based at least in part on the set of log data; and altering one or more parameters of the first machine-learned model to reduce the first loss and the second loss.

N. The one or more non-transitory computer-readable media of any one of paragraphs G-M, wherein the operations further comprise: determining, by a third machine-learned model based at least in part on the virtual object track, a predicted trajectory associated with the candidate object detection, wherein the third machine-learned model comprises a kinematics model, Kalman filter, or neural network that determines the predicted trajectory based at least in part on the virtual object track.

O. A method comprising: receiving at least one of sensor data or map data associated with an environment in which a vehicle is operating and a current vehicle state of the vehicle;

determining, by a first machine-learned model and based at least in part on the current vehicle state and at least one of the sensor data or map data, a virtual object grid, wherein a portion of the virtual object grid indicates: a likelihood that an occluded object or newly disoccluded object exists at a portion of the environment corresponding with the portion of the virtual object grid, and a velocity associated with the portion of the virtual object grid; determining, by a second machine-learned model based at least in part on the virtual object grid, a virtual object track indicating a candidate object detection and a current and historical at least one of position, orientation, velocity, acceleration, a region of interest, or classification associated with the candidate object detection; and controlling the vehicle based at least in part on the virtual object track.

P. The method of paragraph O, wherein determining the virtual object track by the second machine-learned model is based at least in part on: a second output head of the first machine-learned model that determines the virtual object track based at least in part on the virtual object grid; or the second machine-learned model determines the virtual object track based at least in part on: determining a subset of the virtual object grid that comprises likelihoods that meets or exceeds a threshold likelihood; and determining, by one or more machine-learned layers based at least in part on the subset, at least one of a region of interest, position, orientation, or velocity associated with the candidate object detection.

Q. The method of either paragraph O or P, wherein: the sensor data comprises multiple sets of sensor data, each associated with different times from a current time to a time in the past; and the virtual object grid comprises multiple virtual object grids, each associated with different times from the current time to at least one of the time in the past or a time in the future.

R. The method of any one of paragraphs O-Q further comprising: receiving second sensor data; and either: determining, by a perception component of the vehicle, an object detection associated with the candidate object detection; and affirming the candidate object detection as a true positive; or determining, by the perception component of the vehicle, no object exists associated with the candidate object detection; and suppressing the candidate object detection as a false positive.

S. The method of paragraph R comprising affirming the candidate object detection as a true positive and the method of paragraph R further comprising initializing an object track associated with the object detection based at least in part on the virtual object track.

T. The method of any one of paragraphs O-S further comprising: determining, by a third machine-learned model based at least in part on the virtual object track, a predicted trajectory associated with the candidate object detection, wherein the third machine-learned model comprises a kinematics model, Kalman filter, or neural network that determines the predicted trajectory based at least in part on the virtual object track.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Such processes, or any portion thereof, may be performed iteratively in that any or all of the steps may be repeated. Of course, the disclosure is not meant to be so limiting and, as such, any process performed iteratively may comprise, in some examples, performance of the steps a single time.

Conditional language such as, among others, "may," "could," "may" or "might," unless specifically stated otherwise, are understood within the context to indicate that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a," "an" or other similar articles means singular and/or plural. When referring to a collection of items as a "set," it should be understood that the definition may include, but is not limited to, the common understanding of the term in mathematics to include any number of items including a null set (0), 1, 2, 3, . . . up to and including an infinite set.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and non-transitory memory storing processor-executable instructions that, when executed by the one or more processors, cause the system to perform operations comprising:

determining, based at least in part on at least one of sensor data or map data, a top-down representation of an environment in which a vehicle is operating and a current vehicle state of the vehicle, the top-down representation including the map data and a region of the environment occluded to one or more sensors of the vehicle;

determining, by a first machine-learned model and based at least in part on the top-down representation and the current vehicle state, a virtual object grid, wherein a portion of the virtual object grid indicates:

a likelihood that an occluded object or newly discccluded object exists at a portion of the environment corresponding with the portion of the virtual object grid, and a velocity associated with the portion of the virtual object grid;

determining, by a second machine-learned model based at least in part on the virtual object grid, a virtual object track indicating a candidate object detection and a current and historical at least one of position, orientation, velocity, acceleration, region of interest, or classification associated with the candidate object detection; and determining, by a third machine-learned model and based at least in part on the virtual object track, a predicted trajectory associated with the candidate object detection; and controlling the vehicle based at least in part on the virtual object track and the predicted trajectory, wherein determining the predicted trajectory associated with the candidate object detection comprises resolving the candidate object detection as one of a true positive or a false positive.

2. The system of claim 1, wherein determining the virtual object track by the second machine-learned model is based at least in part on:

a second output head of the first machine-learned model determining the virtual object track based at least in part on the virtual object grid; or the second machine-learned model determining the virtual object track based at least in part on:

determining a subset of the virtual object grid that comprises likelihoods that meet or exceed a threshold likelihood.

3. The system of claim 1, wherein:

the top-down representation comprises multiple top-down representations, each associated with different times from a current time to a time in the past; and the virtual object grid comprises multiple virtual object grids, each associated with different times from the current time to at least one of the time in the past or a time in the future.

4. The system of claim 1, wherein the sensor data is first sensor data and the operations further comprise:

receiving second sensor data; and either:

determining, by a perception component of the vehicle, an object detection associated with the candidate object detection; and affirming the candidate object detection as the true positive; or determining, by the perception component of the vehicle, an absence of an object associated with the candidate object detection; and suppressing the candidate object detection as the false positive.

5. The system of claim 4, wherein the operations of claim 4 comprise affirming the candidate object detection as the true positive and the operations further comprise initializing an object track associated with the object detection based at least in part on the virtual object track.

6. One or more non-transitory computer-readable media storing processor-executable instructions that, when executed by one or more processors, perform operations comprising:

receiving at least one of sensor data or map data associated with an environment in which a vehicle is operating, and a current vehicle state of the vehicle;

determining, by a first machine-learned model and based at least in part on the current vehicle state and at least one of the sensor data or the map data, a virtual object grid, wherein a portion of the virtual object grid indicates:

a likelihood that an occluded object or newly disoccluded object exists at a portion of the environment corresponding with the portion of the virtual object grid, and a velocity associated with the portion of the virtual object grid;

determining, by a second machine-learned model and based at least in part on the virtual object grid, a virtual object track indicating a candidate object detection and a current and historical at least one of position, orientation, velocity, acceleration, a region of interest, or classification associated with the candidate object detection; and controlling the vehicle based at least in part on the virtual object track, wherein controlling the vehicle comprises resolving the candidate object detection as one of a true positive or a false positive.

7. The one or more non-transitory computer-readable media of claim 6, wherein the first machine-learned model and the second machine-learned model are part of a single machine-learned model architecture.

8. The one or more non-transitory computer-readable media of claim 7, wherein determining the virtual object track by the second machine-learned model is based at least in part on:

a second output head of the first machine-learned model determining the virtual object track based at least in part on the virtual object grid; or the second machine-learned model determining the virtual object track based at least in part on:

determining a subset of the virtual object grid that comprises likelihoods that meet or exceed a threshold likelihood.

9. The one or more non-transitory computer-readable media of claim 7, wherein:

the sensor data comprises multiple sets of sensor data, each associated with different times from a current time to a time in the past; and the virtual object grid comprises multiple virtual object grids, each associated with different times from the current time to at least one of the time in the past or a time in the future.

10. The one or more non-transitory computer-readable media of claim 7, wherein the sensor data is first sensor data and the operations further comprise:

receiving second sensor data; and either:

determining, by a perception component of the vehicle, an object detection associated with the candidate object detection; and affirming the candidate object detection as the true positive; or determining, by the perception component of the vehicle, an absence of an object associated with the candidate object detection; and suppressing the candidate object detection as the false positive.

11. The one or more non-transitory computer-readable media of claim 10, wherein the operations of claim 10 comprise affirming the candidate object detection as a true positive and the operations further comprise initializing an object track associated with the object detection based at least in part on the virtual object track.

12. The one or more non-transitory computer-readable media of claim 6, wherein at least one of the true positive or the false positive are used as part of refining at least one of the first machine-learned model, the second machine-learned model, or a third machine-learned model.

13. The one or more non-transitory computer-readable media of claim 7, wherein training the first machine-learned model comprises:

determining a set of log data comprising log data indicating that an object detection was determined for an object that was not detected at a first time immediately previous to a second time;

determining a first loss based at least in part on a difference between an occupancy output of the first machine-learned model and an occupancy region indicated by the object detection;

determining a second loss based at least in part on a difference between a velocity output of the first machine-learned model and a velocity associated with the object detection determined based at least in part on the set of log data; and altering one or more parameters of the first machine-learned model to reduce the first loss and the second loss.

14. The one or more non-transitory computer-readable media of claim 7, wherein the operations further comprise:

determining, by a third machine-learned model and based at least in part on the virtual object track, a predicted trajectory associated with the candidate object detection, wherein the third machine-learned model comprises a kinematics model, a Kalman filter, or a neural network that determines the predicted trajectory based at least in part on the virtual object track.

15. A method comprising:

receiving at least one of sensor data or map data associated with an environment in which a vehicle is operating, and a current vehicle state of the vehicle;

determining, by a first machine-learned model and based at least in part on the current vehicle state and at least one of the sensor data or the map data, a virtual object grid, wherein a portion of the virtual object grid indicates:

a likelihood that an occluded object or newly disoccluded object exists at a portion of the environment corresponding with the portion of the virtual object grid, and a velocity associated with the portion of the virtual object grid;

determining, by a second machine-learned model and based at least in part on the virtual object grid, a virtual object track indicating a candidate object detection and a current and historical at least one of position, orientation, velocity, acceleration, a region of interest, or classification associated with the candidate object detection; and controlling the vehicle based at least in part on the virtual object track, wherein controlling the vehicle comprises resolving the candidate object detection as one of a true positive or a false positive.

16. The method of claim 15, wherein determining the virtual object track by the second machine-learned model is based at least in part on:

a second output head of the first machine-learned model determining the virtual object track based at least in part on the virtual object grid; or the second machine-learned model determining the virtual object track based at least in part on:

determining a subset of the virtual object grid that comprises likelihoods that meet or exceed a threshold likelihood.

17. The method of claim 15, wherein:

the sensor data comprises multiple sets of sensor data, each associated with different times from a current time to a time in the past; and the virtual object grid comprises multiple virtual object grids, each associated with different times from the current time to at least one of the time in the past or a time in the future.

18. The method of claim 15 wherein the sensor data is first sensor data and further comprising:

receiving second sensor data; and either:

determining, by a perception component of the vehicle, an object detection associated with the candidate object detection; and affirming the candidate object detection as the true positive; or determining, by the perception component of the vehicle, an absence of an object associated with the candidate object detection; and suppressing the candidate object detection as the false positive.

19. The method of claim 18 comprising affirming the candidate object detection as the true positive and further comprising initializing an object track associated with the object detection based at least in part on the virtual object track.

20. The method of claim 15 further comprising:

determining, by a third machine-learned model and based at least in part on the virtual object track, a predicted trajectory associated with the candidate object detection, wherein the third machine-learned model comprises a kinematics model, a Kalman filter, or a neural network that determines the predicted trajectory based at least in part on the virtual object track.

* * * * *